US008635693B2

(12) United States Patent
Ormazabal et al.

(10) Patent No.: US 8,635,693 B2
(45) Date of Patent: Jan. 21, 2014

(54) SYSTEM AND METHOD FOR TESTING NETWORK FIREWALL FOR DENIAL-OF-SERVICE (DOS) DETECTION AND PREVENTION IN SIGNALING CHANNEL

(75) Inventors: Gaston S. Ormazabal, New York, NY (US); Henning G. Schulzrinne, Leonia, NJ (US); Sarvesh Nagpal, New York, NY (US); Eilon Yardeni, Brooklyn, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 63 days.

(21) Appl. No.: 13/368,858

(22) Filed: Feb. 8, 2012

(65) Prior Publication Data

US 2012/0137357 A1 May 31, 2012

Related U.S. Application Data

(63) Continuation of application No. 11/771,502, filed on Jun. 29, 2007, now Pat. No. 8,302,186.

(51) Int. Cl.
*G06F 11/00* (2006.01)
*G06F 9/00* (2006.01)
*H04L 29/06* (2006.01)

(52) U.S. Cl.
USPC .............................. 726/22; 726/11; 713/153

(58) Field of Classification Search
USPC ...................................... 726/11, 22; 713/153
See application file for complete search history.

(56) References Cited

U.S. PATENT DOCUMENTS

| 5,414,704 | A | 5/1995 | Spinney |
| 5,465,286 | A | 11/1995 | Clare et al. |
| 5,473,607 | A | 12/1995 | Hausman et al. |
| 5,828,653 | A | 10/1998 | Goss |
| 5,859,980 | A | 1/1999 | Kalkunte |
| 5,909,686 | A | 6/1999 | Muller et al. |
| 5,936,962 | A | 8/1999 | Haddock et al. |
| 5,991,270 | A | 11/1999 | Zwan et al. |
| 6,154,775 | A | 11/2000 | Coss et al. |
| 6,175,902 | B1 | 1/2001 | Runaldue et al. |
| 6,680,089 | B2 | 1/2004 | Miyake et al. |
| 6,701,346 | B1 | 3/2004 | Klein |

(Continued)

OTHER PUBLICATIONS

Kuthan, et al., "Middlebox Communication: Framework and Requirements—Internet Draft," Internet Engineering Task Force (IETF), http://tools.ietf.org/html/draft-kuthan-midcom-framework-00, 26 pages, Internet Engineering: Task Force, Nov. 2000.

(Continued)

*Primary Examiner* — Teshome Hailu

(57) ABSTRACT

A device may measure a first performance, associated with legitimate traffic without attack traffic, of a Session Initiation Protocol (SIP)-based protection device implementing authentication; measure a second performance, associated with legitimate traffic and attack traffic, of the SIP-based protection device implementing authentication; and measure a third performance, associated with legitimate traffic and attack traffic, of the SIP-based protection device implementing authentication and return routability filtering. The device may also measure a first performance associated with legitimate traffic of a Session Initiation Protocol (SIP)-based protection device implementing rate-limiting filtering; measure a second performance associated with legitimate traffic and attack traffic of the SIP-based protection device implementing scheme filtering; and measure a third performance associated with legitimate traffic of the SIP-based protection device not implementing rate-limiting filtering without attack traffic.

21 Claims, 16 Drawing Sheets

(56) References Cited

U.S. PATENT DOCUMENTS

| | | |
|---|---|---|
| 6,707,817 B1 | 3/2004 | Kadambi et al. |
| 6,816,910 B1 | 11/2004 | Ricciulli |
| 6,826,616 B2 | 11/2004 | Larson et al. |
| 6,880,089 B1 | 4/2005 | Bommareddy et al. |
| 6,920,107 B1 | 7/2005 | Qureshi et al. |
| 6,930,598 B2 | 8/2005 | Weiss |
| 6,934,756 B2 | 8/2005 | Maes |
| 7,007,299 B2 | 2/2006 | Ioele et al. |
| 7,072,291 B1 | 7/2006 | Jagadeesan et al. |
| 7,076,393 B2 | 7/2006 | Ormazabal et al. |
| 7,254,832 B1 | 8/2007 | Christie |
| 7,340,166 B1 | 3/2008 | Sylvester et al. |
| 7,385,927 B2 | 6/2008 | Gygi et al. |
| 7,385,931 B2 | 6/2008 | Magnaghi et al. |
| 7,421,734 B2 | 9/2008 | Ormazabal et al. |
| 7,440,573 B2 * | 10/2008 | Lor et al. ............... 380/270 |
| 7,499,405 B2 | 3/2009 | Gilfix et al. |
| 7,634,249 B2 | 12/2009 | Hahn et al. |
| 7,653,938 B1 | 1/2010 | Touitou et al. |
| 7,672,336 B2 * | 3/2010 | Bharrat et al. ............ 370/476 |
| 7,716,725 B2 | 5/2010 | Xie |
| 7,721,091 B2 * | 5/2010 | Iyengar et al. ............ 713/166 |
| 8,027,251 B2 | 9/2011 | Ormazabal et al. |
| 2002/0083187 A1 | 6/2002 | Sim et al. |
| 2002/0112073 A1 | 8/2002 | MeLampy et al. |
| 2002/0156903 A1 | 10/2002 | Bach Corneliussen |
| 2003/0009561 A1 | 1/2003 | Sollee |
| 2003/0055931 A1 | 3/2003 | Cravo De Almeida et al. |
| 2003/0076780 A1 | 4/2003 | Loge et al. |
| 2003/0086425 A1 | 5/2003 | Bearden et al. |
| 2003/0093562 A1 | 5/2003 | Padala |
| 2003/0093563 A1 | 5/2003 | Young et al. |
| 2003/0115321 A1 | 6/2003 | Edmison et al. |
| 2003/0117961 A1 | 6/2003 | Chuah et al. |
| 2003/0120816 A1 | 6/2003 | Berthaud et al. |
| 2003/0126464 A1 | 7/2003 | McDaniel et al. |
| 2003/0135639 A1 | 7/2003 | Marejka et al. |
| 2003/0165136 A1 | 9/2003 | Cornelius et al. |
| 2003/0195861 A1 | 10/2003 | McClure et al. |
| 2004/0001443 A1 | 1/2004 | Soon et al. |
| 2004/0013086 A1 | 1/2004 | Simon et al. |
| 2004/0015579 A1 | 1/2004 | Cooper et al. |
| 2004/0028035 A1 | 2/2004 | Read |
| 2004/0034793 A1 | 2/2004 | Yuan |
| 2004/0039938 A1 | 2/2004 | Katz et al. |
| 2004/0068668 A1 | 4/2004 | Lor et al. |
| 2004/0128554 A1 | 7/2004 | Maher et al. |
| 2004/0133772 A1 | 7/2004 | Render |
| 2004/0136379 A1 | 7/2004 | Liao et al. |
| 2004/0208186 A1 | 10/2004 | Eichen et al. |
| 2004/0236966 A1 | 11/2004 | D'Souza et al. |
| 2004/0244058 A1 | 12/2004 | Carlucci et al. |
| 2004/0255156 A1 | 12/2004 | Chan et al. |
| 2005/0018618 A1 | 1/2005 | Mualem et al. |
| 2005/0050377 A1 | 3/2005 | Chan et al. |
| 2005/0076235 A1 * | 4/2005 | Ormazabal et al. ............ 713/201 |
| 2005/0165917 A1 * | 7/2005 | Le et al. ............ 709/220 |
| 2005/0201320 A1 | 9/2005 | Kiss et al. |
| 2005/0201357 A1 | 9/2005 | Poyhonen |
| 2005/0232229 A1 | 10/2005 | Miyamoto et al. |
| 2006/0007868 A1 | 1/2006 | Shinomiya |
| 2006/0013192 A1 | 1/2006 | Le et al. |
| 2006/0075084 A1 * | 4/2006 | Lyon ............ 709/223 |
| 2006/0075132 A1 | 4/2006 | Liu |
| 2006/0077981 A1 | 4/2006 | Rogers |
| 2006/0146792 A1 | 7/2006 | Ramachandran et al. |
| 2006/0165060 A1 | 7/2006 | Dua |
| 2006/0227766 A1 | 10/2006 | Mickle et al. |
| 2007/0022479 A1 | 1/2007 | Sikdar et al. |
| 2007/0110053 A1 * | 5/2007 | Soni et al. ............ 370/389 |
| 2007/0118894 A1 | 5/2007 | Bhatia |
| 2007/0121596 A1 | 5/2007 | Kurapati et al. |
| 2007/0192863 A1 * | 8/2007 | Kapoor et al. ............ 726/23 |
| 2008/0037447 A1 * | 2/2008 | Garg et al. ............ 370/260 |
| 2008/0040801 A1 | 2/2008 | Buriano et al. |

OTHER PUBLICATIONS

Rosenberg: at al,, "SIP: Session initiation Protocol—RFC 3261," Network Working Group, The Internet Society, 269 pages, Jun. 2002.

\* cited by examiner

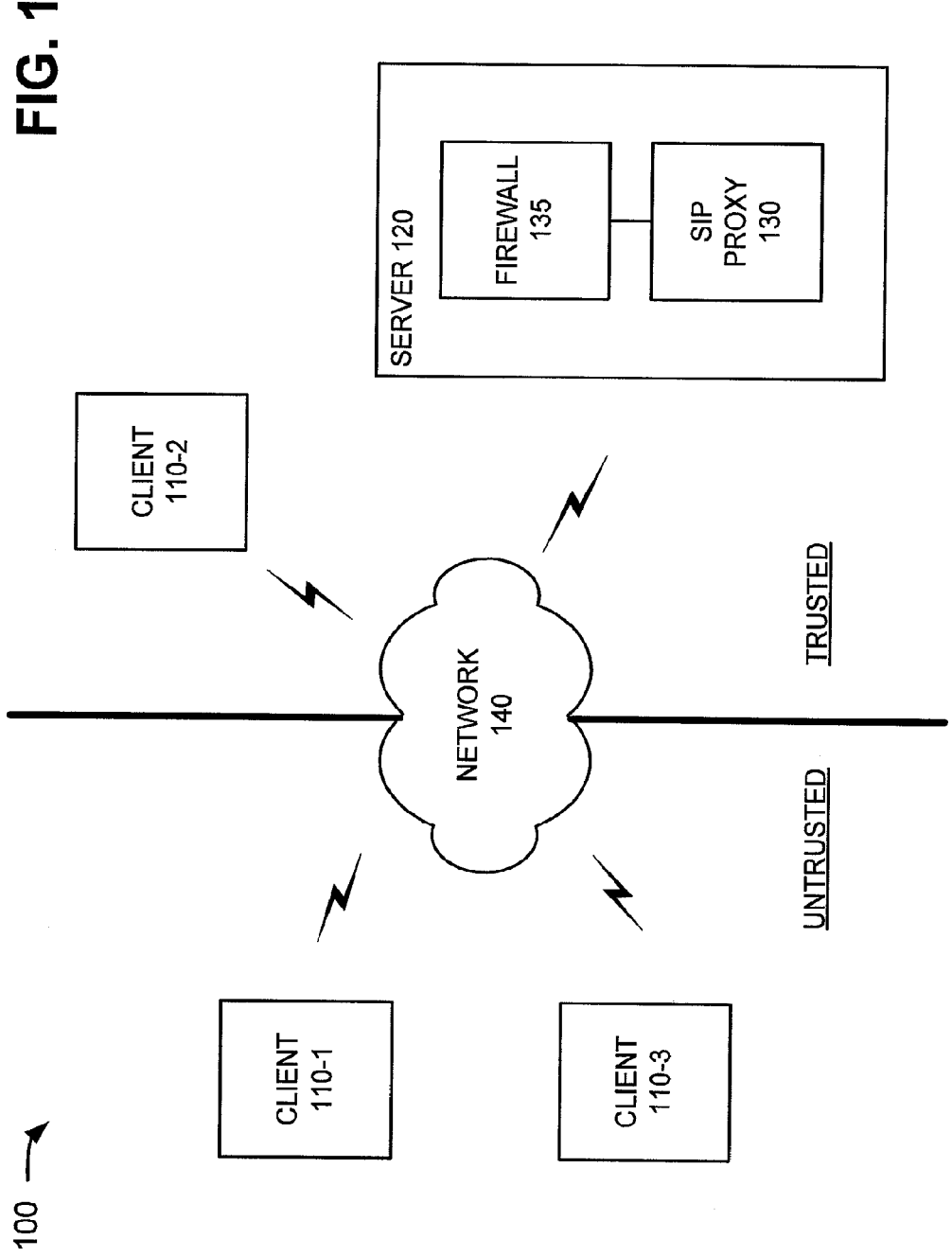

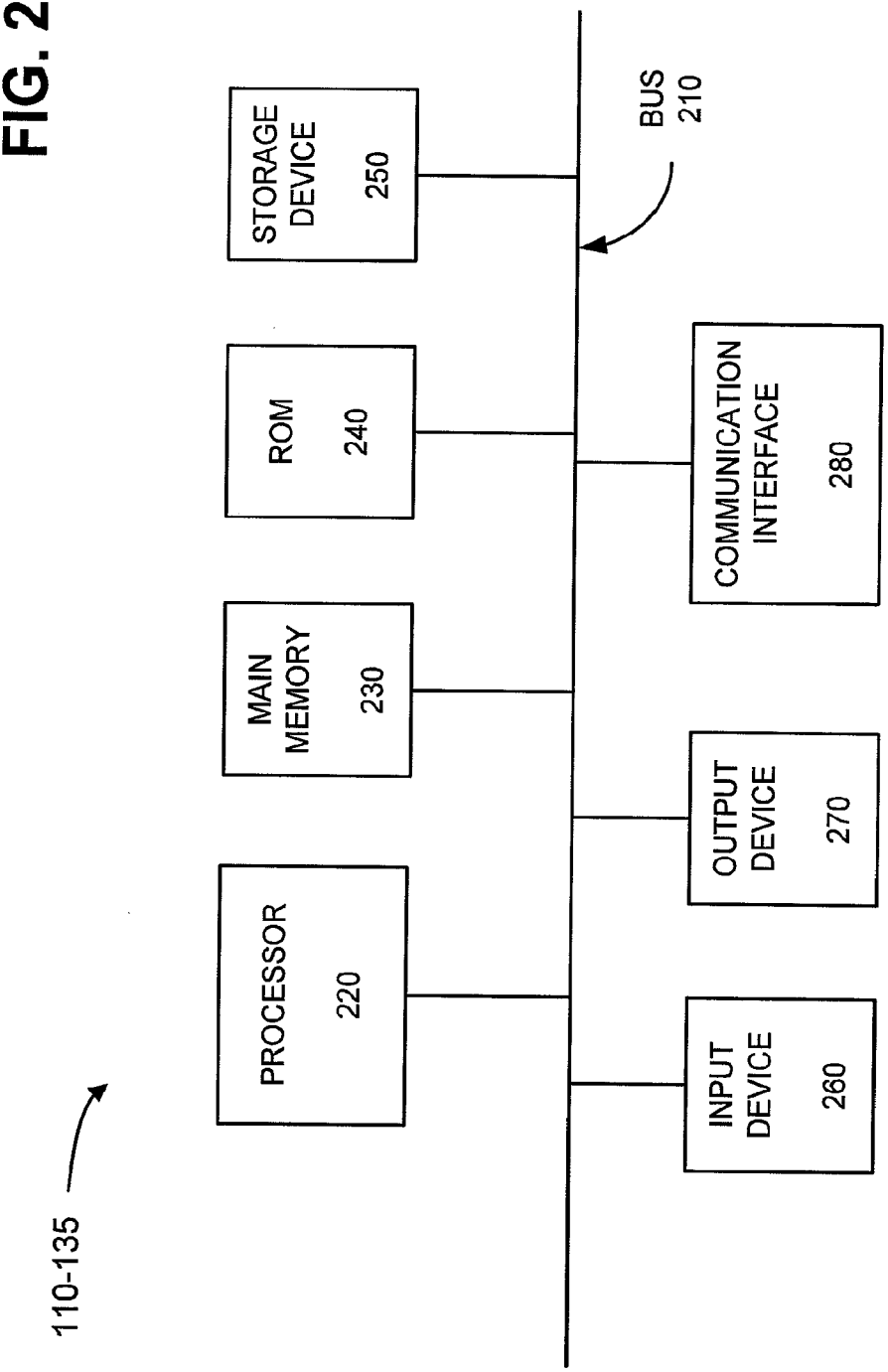

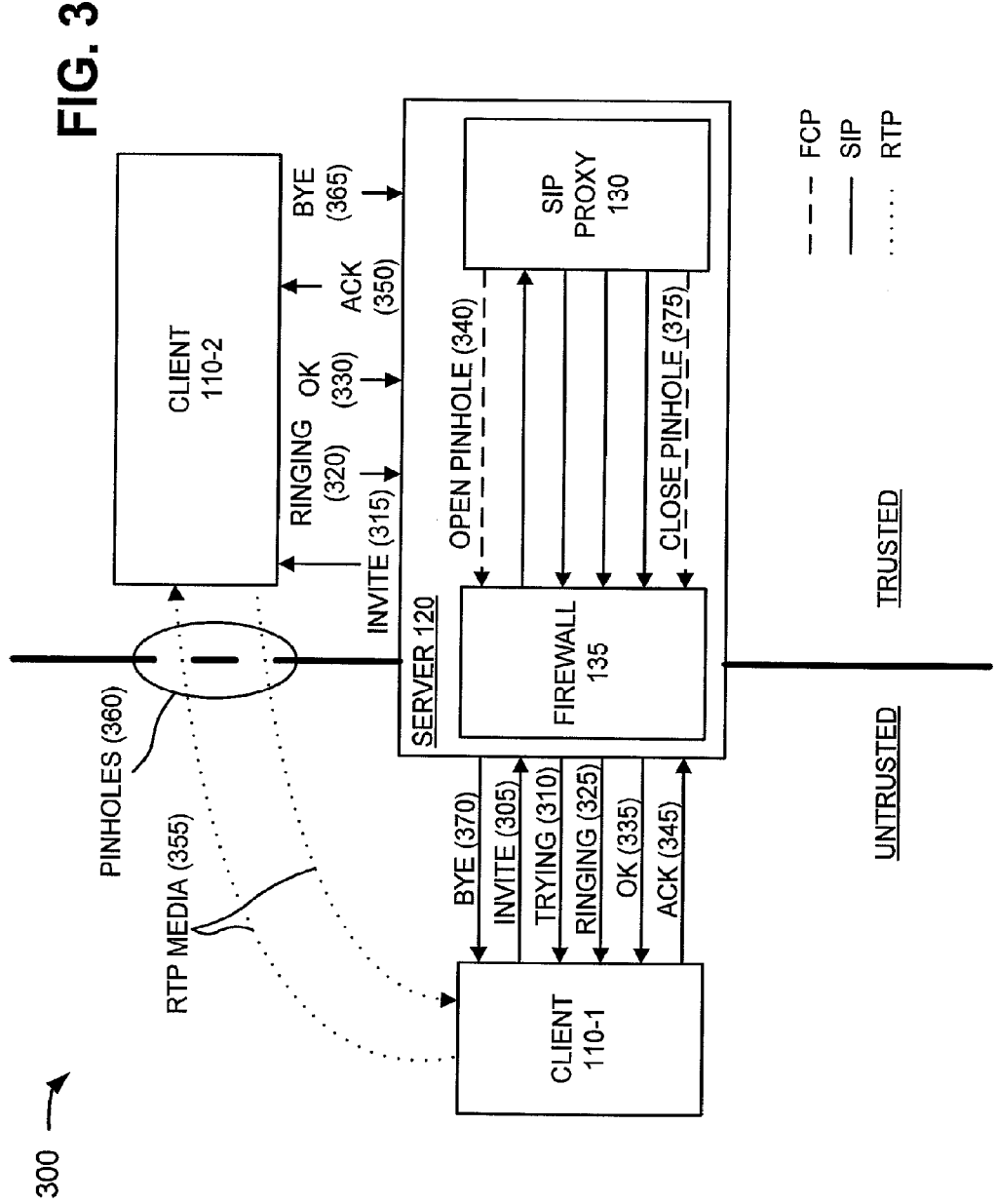

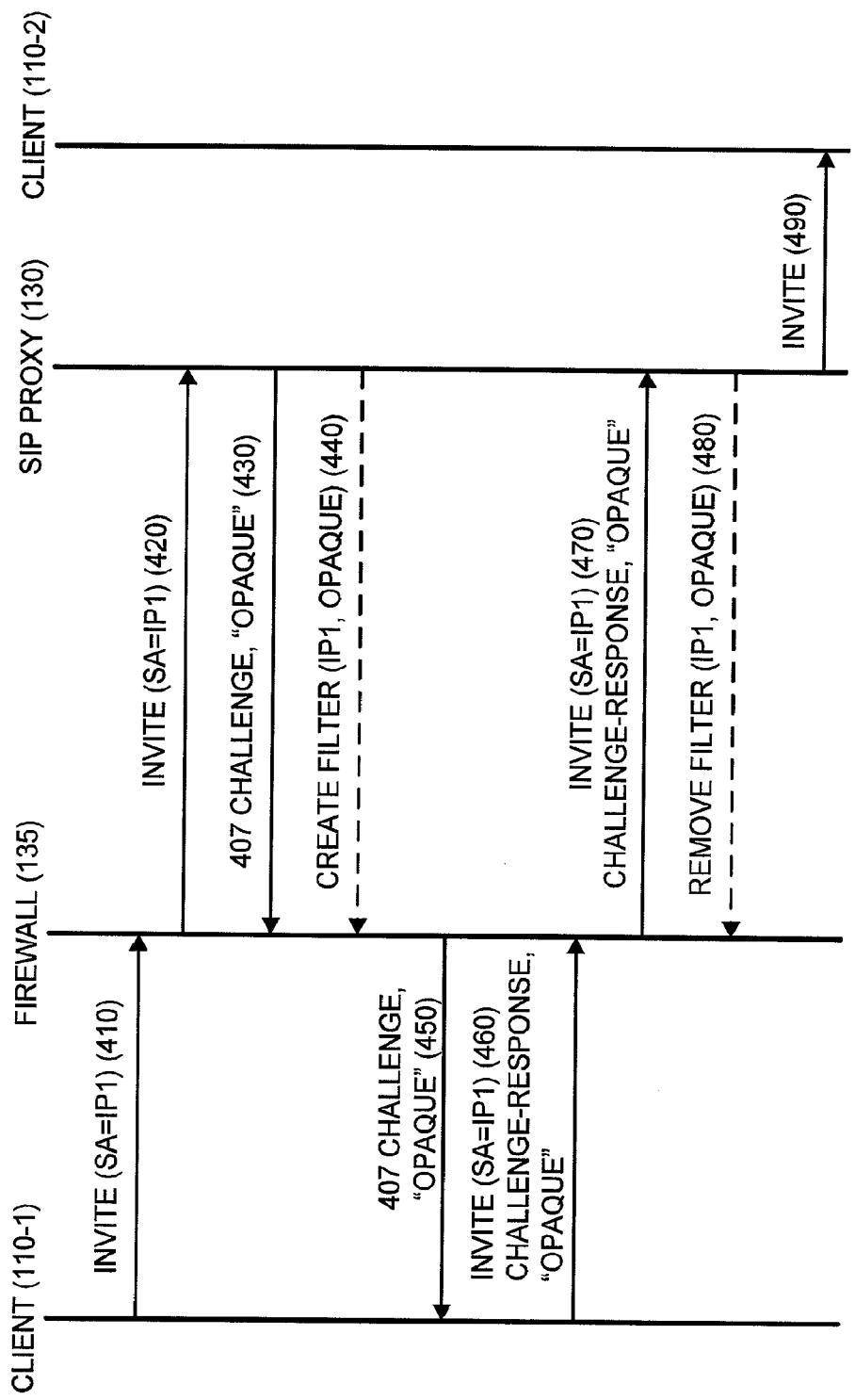

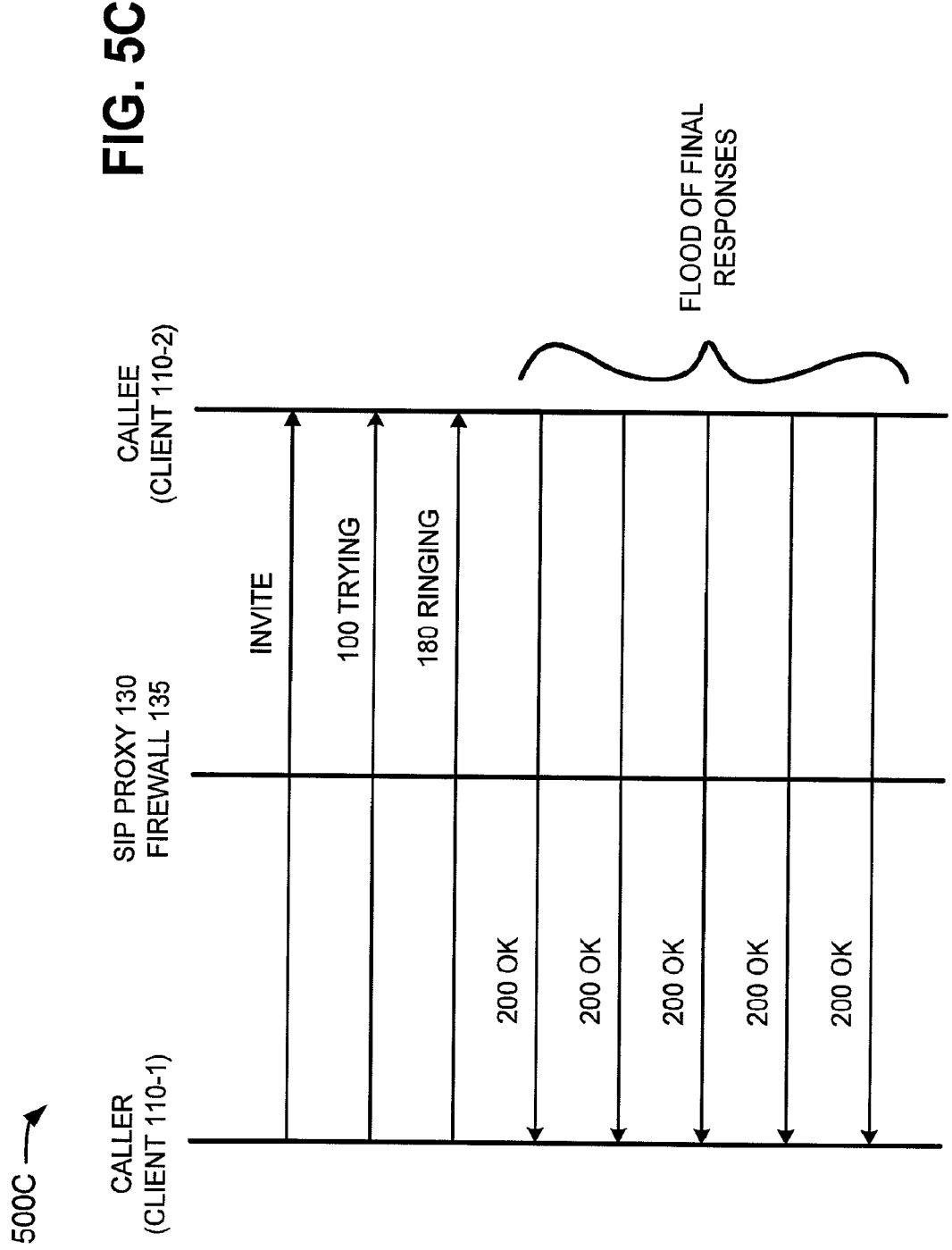

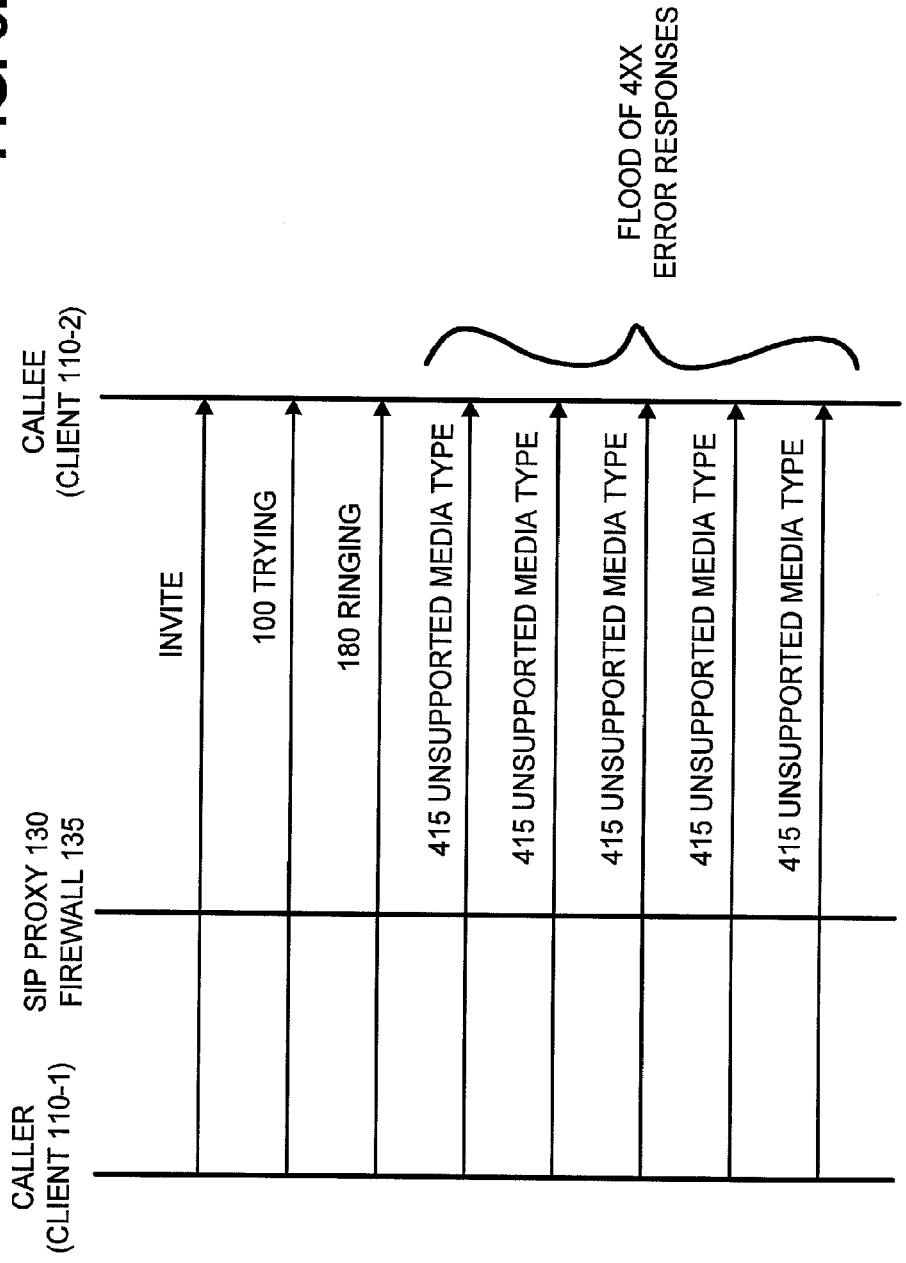

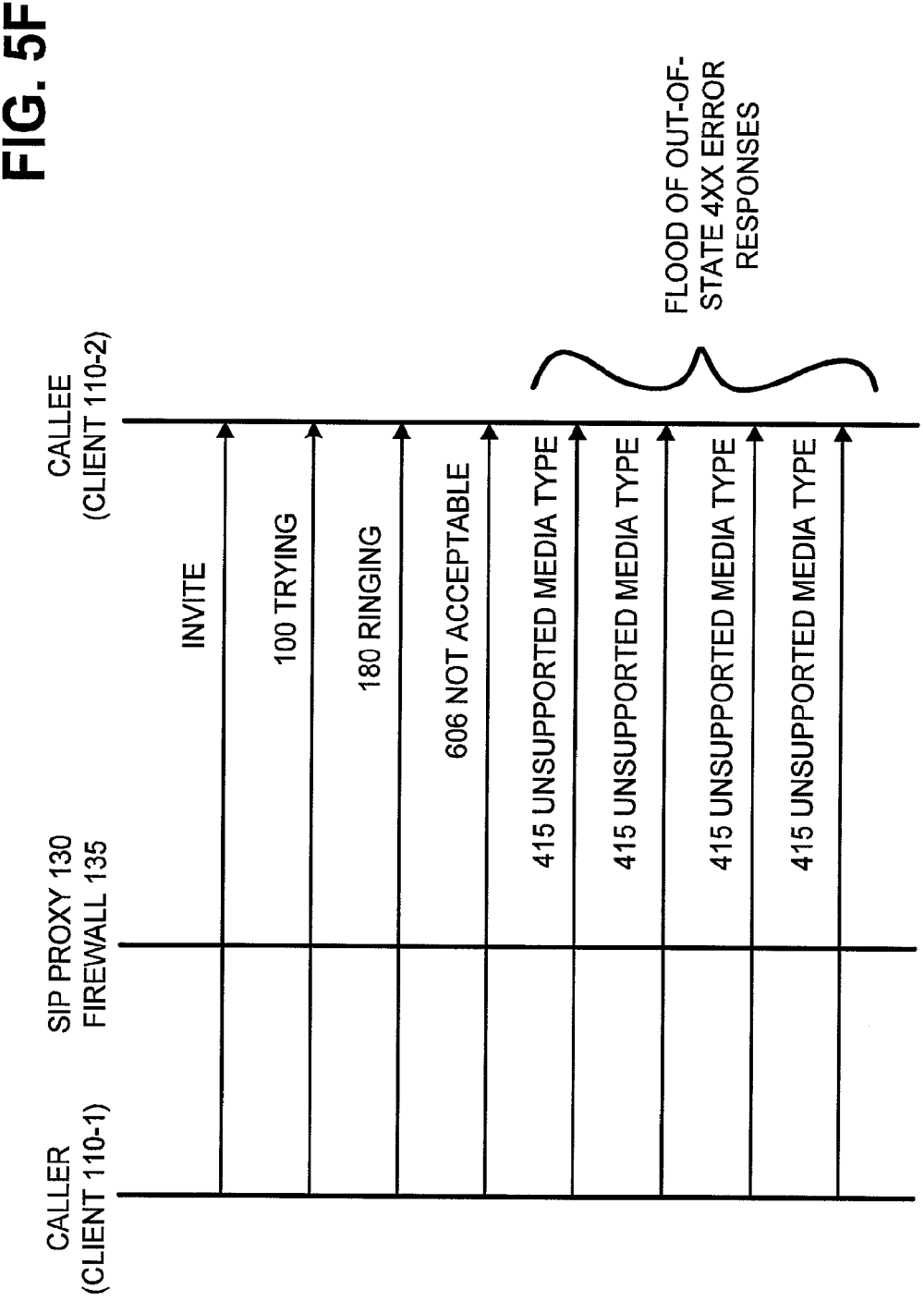

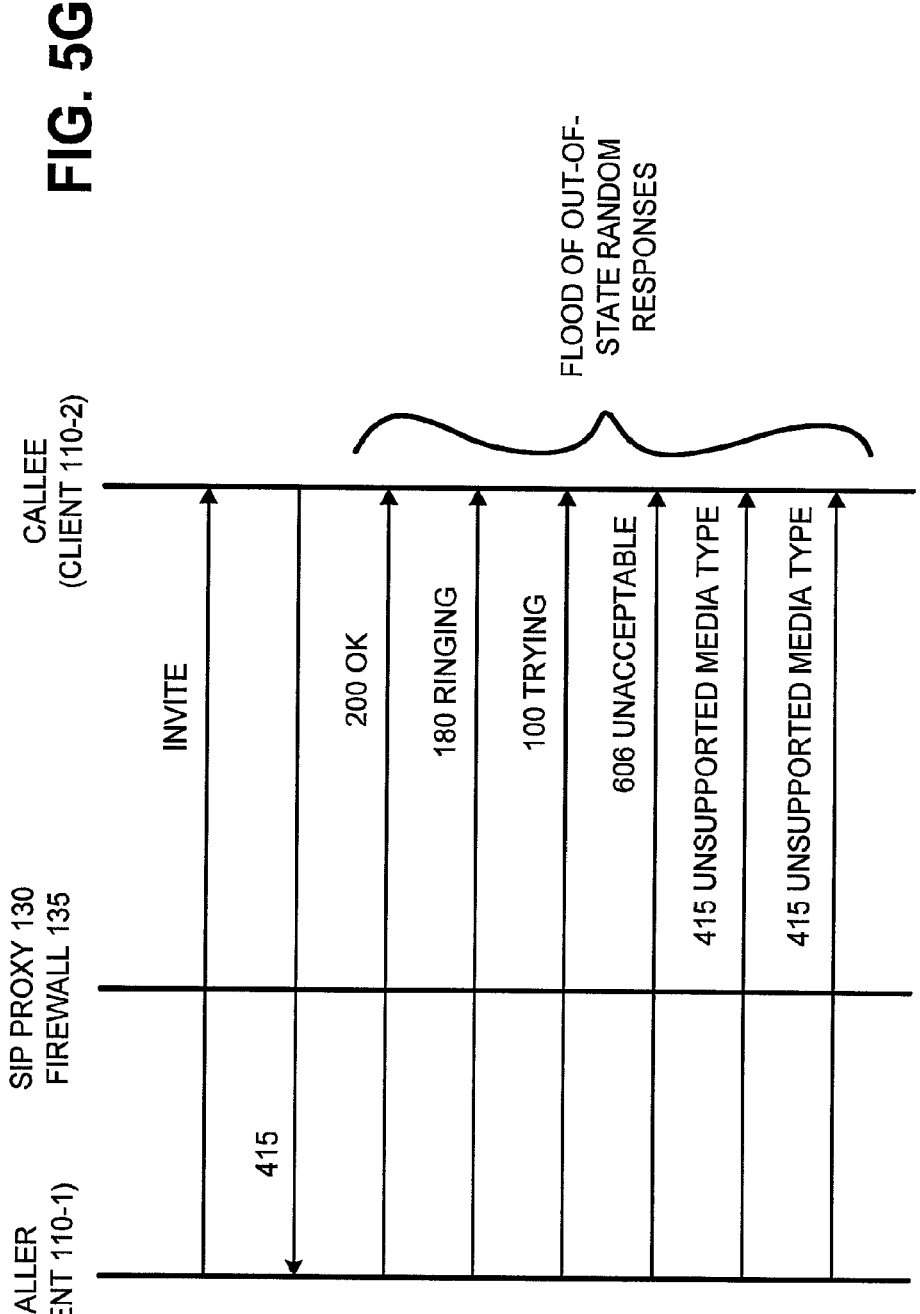

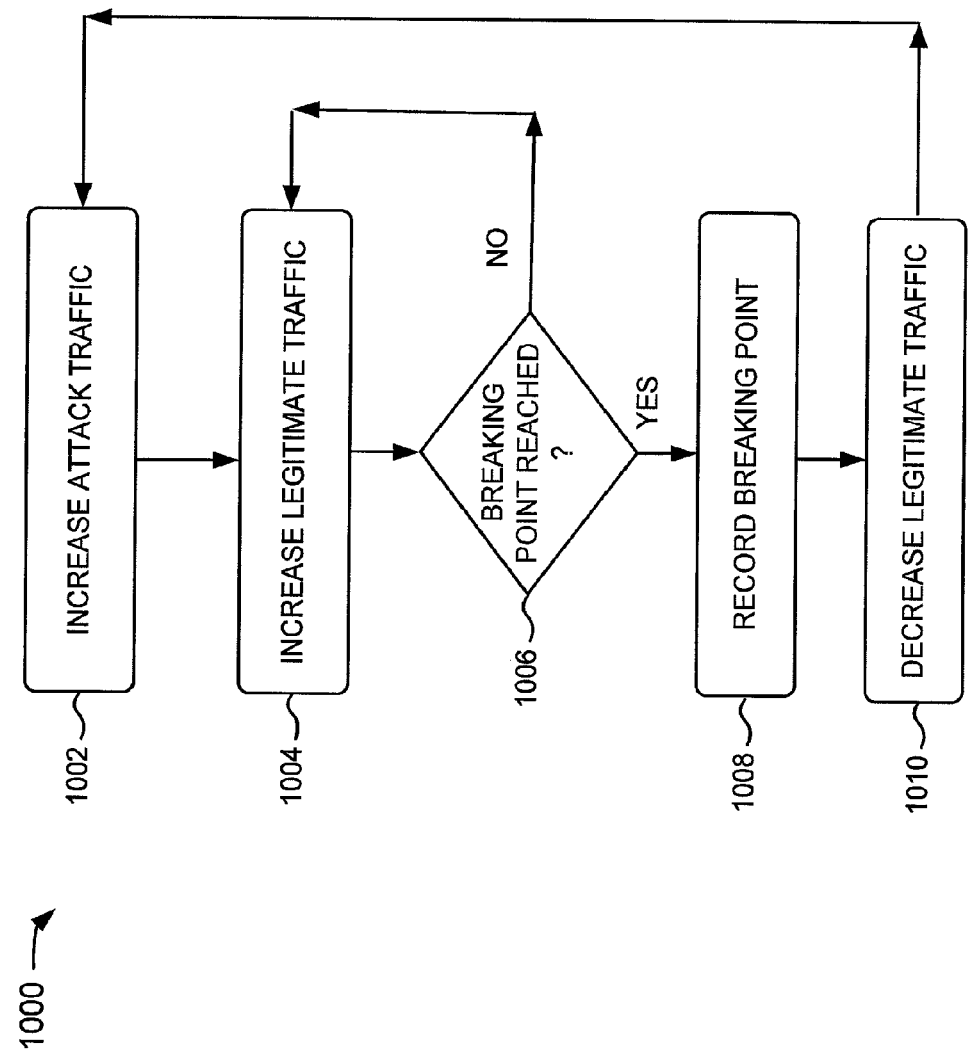

SYSTEM AND METHOD FOR TESTING NETWORK FIREWALL FOR DENIAL-OF-SERVICE (DOS) DETECTION AND PREVENTION IN SIGNALING CHANNEL

RELATED APPLICATIONS

The present application is a continuation of application Ser. No. 11/771,502, filed Jun. 29, 2007, which is hereby incorporated by reference.

BACKGROUND INFORMATION

Session Initiation Protocol (SIP) is an application-layer control (e.g., signaling) protocol for creating, modifying, and terminating sessions with one or more participants. These sessions may include Internet-based telephone calls, multimedia distribution, multimedia conferences, instant messaging conferences, interactive voice response (IVR) sessions, automated and manual operator services, automatic call distribution, call routing, etc. SIP invitations or INVITES may be used to create sessions and may carry session descriptions that allow participants to agree on a set of compatible media types. SIP may use proxy servers to help route requests to a user's current location, authenticate and authorize users for services, implement provider call-routing policies, and/or provide other features to users. SIP may also provide a registration function that allows users to upload their current locations for use by proxy servers.

Networks implementing voice over Internet Protocol (VoIP) may use network perimeter protection devices, such as firewalls, to block unwanted and/or potentially malicious traffic from infiltrating the network.

BRIEF DESCRIPTION OF THE DRAWINGS

FIG. 1 depicts an exemplary network in which systems and methods described herein may be implemented;

FIG. 2 depicts an exemplary device, client, or server, configured to communicate via the exemplary network illustrated in FIG. 1;

FIG. 3 depicts an exemplary SIP and Firewall Control Protocol (FCP) call flow diagram using the exemplary network illustrated in FIG. 1;

FIG. 4 is an exemplary call flow between a firewall and a SIP proxy;

FIGS. 5A through 5G are diagrams associated with flood traffic;

FIGS. 7 through 10 are flowcharts of exemplary processes according to implementations described herein.

DETAILED DESCRIPTION OF PREFERRED EMBODIMENTS

Figure 5A:
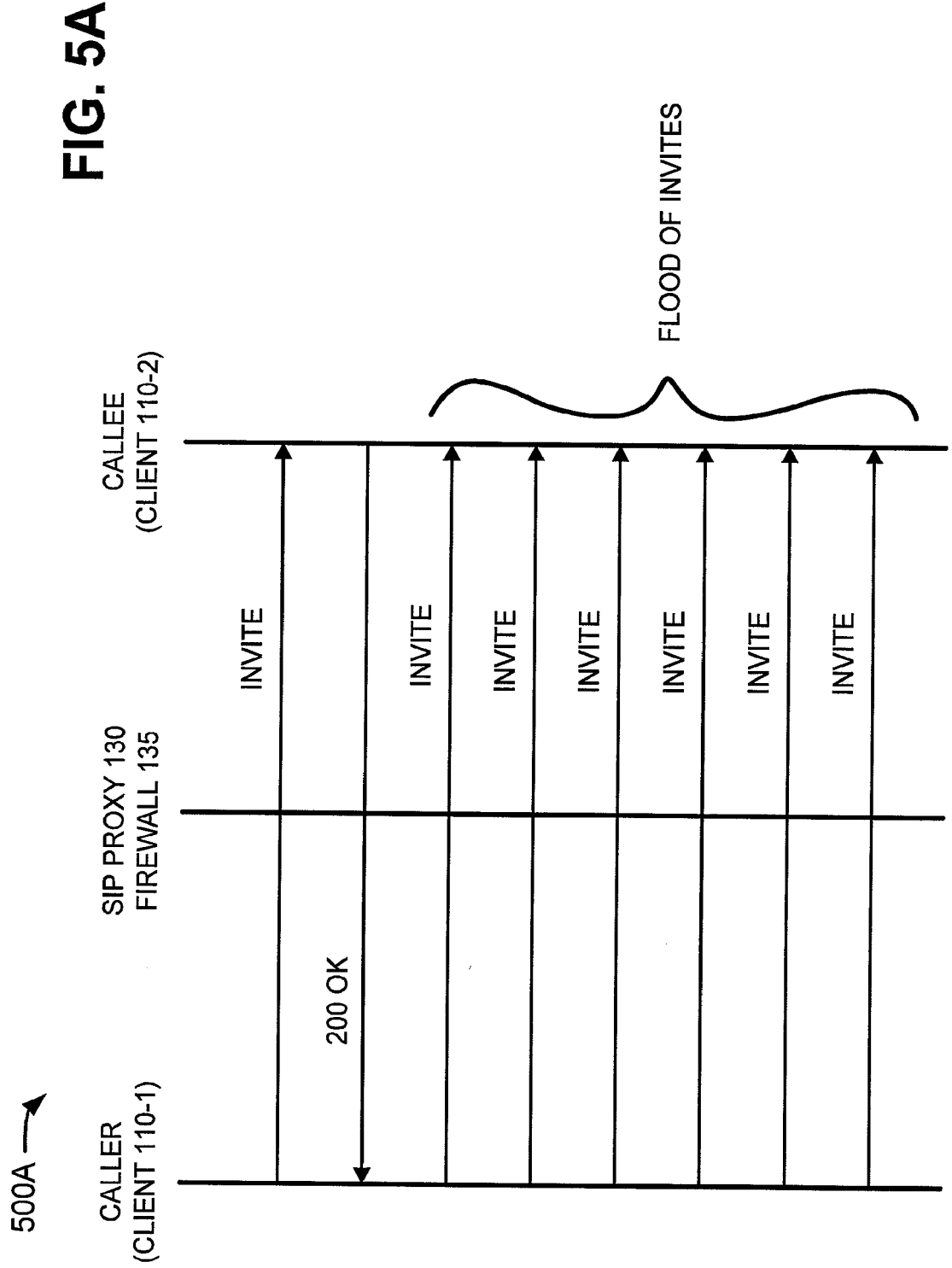

The following detailed description refers to the accompanying drawings. The same reference numbers in different drawings may identify the same or similar elements. Also, the following detailed description does not limit the invention.

Embodiments described herein may test, analyze, and validate a large scale SIP-aware application layer network perimeter protection device (e.g., a firewall). For example, the systems and methods may measure the capacity (e.g., the breaking point) of the SIP-aware firewall as it filters attack traffic, such as spoofed and/or floods of SIP messages. The systems and methods may generate VoIP load traffic for the SIP-aware firewall to test and analyze performance of the SIP-aware firewall under load conditions. The load conditions may include generated attack traffic. The systems and methods described herein may address the effectiveness of the SIP-aware firewall that potentially could result in security vulnerabilities.

FIG. 1 depicts an exemplary environment 100 in which systems and methods described herein may be implemented. Environment 100 may include multiple clients 110-1, 110-2, and 110-3 (collectively 110, individually 110-x) connected to multiple servers (e.g., a server 120) via a network 140. Three clients 110 and one server 120 have been illustrated as connected to network 140 for simplicity. In practice, there may be more or fewer clients and servers. Also, in some instances, a client may perform one or more functions of a server and/or a server may perform one or more functions of a client.

Network 140 may include a local area network (LAN), a wide area network (WAN), a telephone network, such as the Public Switched Telephone Network (PSTN), an intranet, the Internet, a SIP-based network, a VoIP-based network, an IVR-based network, or a combination of networks. Clients 110 and server 120 may connect to network 140 via wired, wireless, and/or optical connections.

Clients 110 may include client entities. An entity may be defined as a device, such as a personal computer, a SIP telephone, a wireless telephone, a personal digital assistant (PDA), a laptop, or another type of computation or communication device, a thread or process running on one of these devices, and/or an object executable by one of these devices.

Server 120, also referred to as a network server, may include a device that facilitates the establishment of SIP calls, or a device that is capable of facilitating SIP-based communications, e.g., Internet-based telephone calls, multimedia distribution, multimedia conferences, instant messaging conferences, IVR sessions, VoIP sessions, automated and manual operator services, automatic call distribution, call routing, etc.

Server 120 may include a server entity that gathers, processes, searches, and/or maintains applications (e.g., a high-speed, high-capacity packet processing applications server). As further shown in FIG. 1, server 120 may include a SIP proxy 130 and a firewall 135. SIP proxy 130 may include a device that facilitates the establishment of SIP calls. In accordance with the Internet Engineering Task Force (IETF) document RFC 2543 and document RFC 3261, server 120 may act as both a server and a client for the purpose of making requests on behalf of other clients. Requests may be serviced internally or by passing them on, possibly after translation, to other servers. Server 120 may interpret, and, if necessary, rewrite a request message before forwarding it. Server 120, e.g., SIP proxy 130 and firewall 135 may be considered a "SIP-based perimeter protection device."

Firewall 135 may include a device which may be configured to permit, deny, and/or proxy data connections and be configured to prevent unwanted and/or potentially malicious traffic from infiltrating environment 100. Firewall 135 may be hardware and/or software based. A task of firewall 135 may be to control traffic between devices (e.g., clients 110) of network 140 with different zones of trust. For example, as shown in FIG. 1, clients 110-1 and 110-3 may reside in an untrusted or not trusted zone (e.g., the Internet), whereas client 110-2 and server 120 may reside in a trusted zone (e.g., an internal network). Firewall 135 may provide a controlled interface between zones of differing trust levels through the enforcement of a security policy. In one implementation, firewall 135 may operate on data on behalf of an organizational network (e.g., a private network) and may prevent unwanted and/or potentially malicious traffic from untrusted sources. For example, firewall 135 may receive all, or substantially all, data destined for server 120 or trusted client 110-2 and/or transmitted by server 120 or trusted client 110-2.

Embodiments described herein may use a deep-packet inspection filtering device (e.g., firewall 135), which may be deployed at a perimeter of a trusted zone, and may be capable of both detecting and filtering unwanted and/or potentially malicious traffic at carrier-class rates. Firewall 135 may include a high speed database using content addressable memory (CAM) technology for state table(s) storage. Firewall 135 may also use a Firewall Control Protocol (FCP) to update the state table(s) in firewall 135. Firewall 135 may further use packet logic manipulation that may be updated on the CAM state table(s).

Although FIG. 1 shows SIP proxy 130 as part of server 120, in other implementations, SIP proxy 130 may be a separate server entity that includes a device that facilitates the establishment of SIP calls, e.g., as described in RFC 2543 and RFC 3261. Furthermore, although FIG. 1 shows firewall 135 as part of server 120, in other implementations, firewall 135 may be a separate entity that includes a device which may be configured to permit, deny, and/or proxy data connections and configured to prevent unwanted and/or potentially malicious traffic from entering and/or leaving the trusted zone. In still other implementations, firewall 135 may perform some or all of the functions the functions of SIP proxy 130, or SIP proxy 130 may perform some or all of the functions of firewall 135.

Although implementations are described below in the context of SIP and an Internet Protocol (IP)-based network, in other implementations equivalent or analogous communication protocols (e.g., International Telecommunication Union (ITU) H.323) and/or types of transport networks (e.g., asynchronous transfer mode (ATM), frame relay, etc.) may be used. Both the ITU H.323 standard and the IETF's SIP standard are examples of protocols that may be used for establishing a communications session among terminals, such as clients 110, connected to a network. Although SIP-type messages are shown for convenience, any type of protocol or a mixture of such protocols may be applied in various parts of the overall system.

Furthermore, in one implementation, firewall 135 may include the features set forth in co-pending application Ser. No. 11/557,703, filed Nov. 8, 2006, entitled "SYSTEMS AND METHODS FOR IMPLEMENTING A PROTOCOL-AWARE NETWORK FIREWALL," the disclosure of which is incorporated by reference herein in its entirety. In another implementation, firewall 135 may include the features set forth in co-pending application Ser. No. 11/557,740, filed Nov. 8, 2006, entitled "PREVENTION OF DENIAL OF SERVICE (DOS) ATTACKS ON SESSION INITIATION PROTOCOL (SIP)-BASED SYSTEMS USING RETURN ROUTABILITY CHECK FILTERING," the disclosure of which is incorporated by reference herein in its entirety. In still another implementation, firewall 135 may include the features set forth in co-pending application Ser. No. 11/557,739, filed Nov. 8, 2006, entitled "PREVENTION OF DENIAL OF SERVICE (DOS) ATTACKS ON SESSION INITIATION PROTOCOL (SIP)-BASED SYSTEMS USING METHOD VULNERABILITY FILTERING," the disclosure of which is incorporated by reference herein in its entirety. In addition, firewall 135 may be tested using the embodiments disclosed in co-pending application Ser. No. 11/557,751, filed Nov. 8, 2006, entitled "SYSTEM AND METHOD FOR TESTING NETWORK FIREWALL USING FINE GRANULARITY MEASUREMENTS," the disclosure of which is incorporated by reference herein in its entirety. Application Ser. No. 60/947,177, filed Jun. 29, 2007, entitled "THEFT (OF SERVICE ARCHITECTURAL INTEGRITY VALIDATION TOOLS FOR SESSION INITIATION PROTOCOL (SIP)-BASED SYSTEMS,", is herein incorporated by reference in its entirety.

FIG. 2 is an exemplary diagram of a client or server entity (hereinafter called "client/server entity"), which may correspond to one or more of clients 110, server 120, SIP proxy 130, and/or firewall 135. The client/server entity may include a bus 210, a processor 220, a main memory 230, a read only memory (ROM) 240, a storage device 250, an input device 260, an output device 270, and a communication interface 280. Bus 210 may include a path that permits communication among the elements of the client/server entity.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information into the client/server entity, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 140.

As will be described in detail below, the client/server entity may perform certain testing, analysis, and validation operations. The client/server entity may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

FIG. 3 depicts an exemplary SIP and Firewall Control Protocol (FCP) call flow diagram 300 using the components of environment 100. As shown, server 120, SIP proxy 130, and firewall 135 may be provided at a perimeter of a trusted zone and may provide perimeter protection for a trusted client 110-2. An untrusted client 110-1 may send an INVITE request 305 to trusted client 110-2 through server 120. Server 120 may intercept INVITE request 305. SIP proxy 130 may return a TRYING message 310 to untrusted client 110-1, may fetch an Internet-protocol (IP) address and a port number from a Session Description Protocol (SDP) message, and may forward an INVITE request 315 to trusted client 110-2.

Trusted client 110-2 may respond with a RINGING message 320 if the call is not yet established, and firewall 135 and SIP proxy 130 may send a RINGING message 325 to untrusted client 110-1.

As further shown in FIG. 3, if a call is established, trusted client 110-2 may send an OK message 330 (which may contain a media IP address and port number in the SDP body) to server 120, and firewall 135 and SIP proxy 130 may send an OK message 335 to untrusted client 110-1. SIP proxy 130 may fetch trusted client's 110-2 media IP address and port number, may update a state table, and may send an open pinhole FCP command 340 to firewall 135. Using the information in the FCP command 340, firewall 135 may update a CAM database with information regarding pinholes 360, allowing Real-time Transport Protocol (RTP) media streams 355 to flow through pinholes 360 in firewall 135. Untrusted client 110-1 may send an ACK message 345 to server 120, and server 120 may send an ACK message 350 to trusted client 110-2. The line provided between the untrusted and trusted zones in FIG. 3 may correspond to firewall 135. If trusted client 110-2 wishes to terminate the session, trusted client 110-2 may send a BYE message 365 to server 120, and server 120 may send a BYE message 370 to untrusted client 110-1. SIP proxy 130 may remove the session from its state table, and may send a close pinhole FCP command 375 to firewall 135. Firewall 135 may remove the connection from the CAM database, which may close pinholes 360 associated with this particular session.

SIP request messages, such as INVITE message 305, may be transported using the User Datagram Protocol (UDP). UDP itself does not authenticate the sender of packets, which may allow a client, such as untrusted client 110-1, to spoof the source address of an INVITE message and potentially overwhelm a SIP proxy by flooding the SIP proxy with spoofed INVITE messages. Co-pending application Ser. No. 11/557,740 discloses a method and apparatus for authenticating INVITE messages and filtering (e.g., "return routability filtering" or "RR filtering") un-authenticated and/or unwanted INVITE messages. FIG. 4 is an exemplary call flow 400 between implementing authentication and RR filtering. As shown, firewall 135 may receive an INVITE request 410 with "IP1" as a source IP address. If firewall 135 does not find a match in a filter table, firewall 135 may forward request 410 (as indicated by reference number 420) to SIP proxy 130. SIP proxy 130 may receive INVITE request 420 for authentication, and may respond with a "407 CHALLENGE" message 430 that may contain a challenge. SIP proxy 130 may send a FCP message 440 that requests creation of a temporary filter, e.g., a RR filter, for blocking the request's source IP address (IP1). The temporary filter may also contain a "nonce" value that may be part of the authentication challenge and may be included in the authentication response.

As further shown in FIG. 4, firewall 135 may receive FCP message 440 and may create the temporary RR filter. A "407 CHALLENGE" message 450 may be forwarded to untrusted client 110-1. A successful response to the 407 CHALLENGE message may allow client 110-1 to be authenticated. Firewall 135 may receive a SIP INVITE request 460 from client 110-1 in response to the 407 CHALLENGE message 450. Firewall 135 may attempt to match the source IP address in the INVITE message with the IP address in its filter table. If there is a match, firewall 135 (e.g., RR filter of firewall 135) may compare the "nonce" value from the authentication response with the "nonce" value included in the temporary filter. If the nonce values are equal, firewall 135 may forward request 460 (as shown by reference number 470) to SIP proxy 130. Otherwise, firewall 135 may block SIP INVITE request 460. SIP proxy 130 may successfully authenticate request 470, may send a FCP message 480 to firewall 135 that removes the temporary filter from firewall 135, and may forward INVITE message 490 to trusted client 110-2.

Thus, authentication and RR filtering may help thwart spoofed SIP request floods, e.g., INVITE messages. Firewall 135 may block request attempts, coming from the same source, from getting to proxy 130. If the request originator successfully responds with the correct challenge response, SIP proxy 130 may remove the filter from firewall 135. The filter may also be temporary in that it may expire after some period of time (e.g., an order of seconds). RR filtering may include other features as described in co-pending application Ser. No. 11/557,740.

Figure 5B:
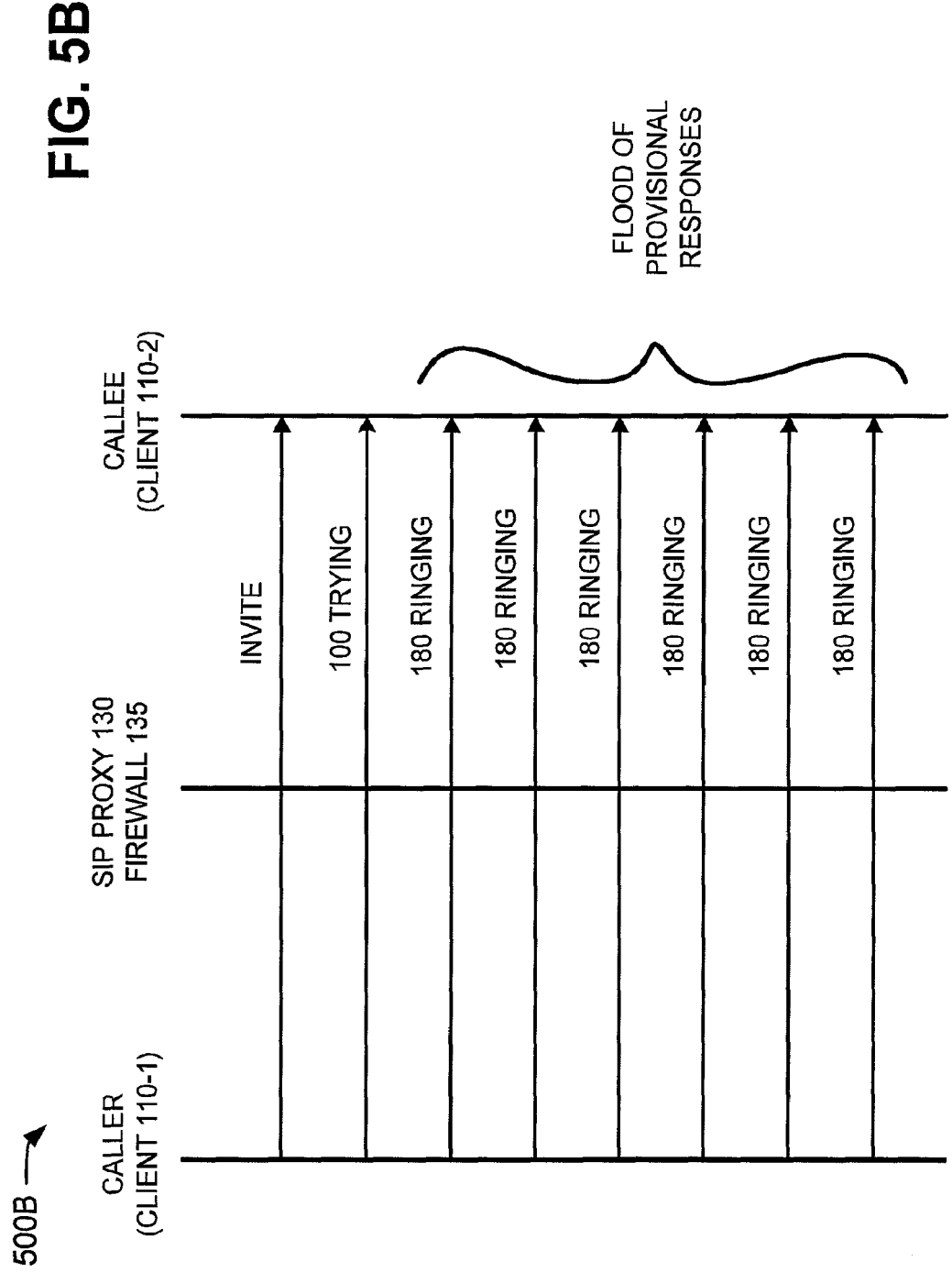
Figure 5E:
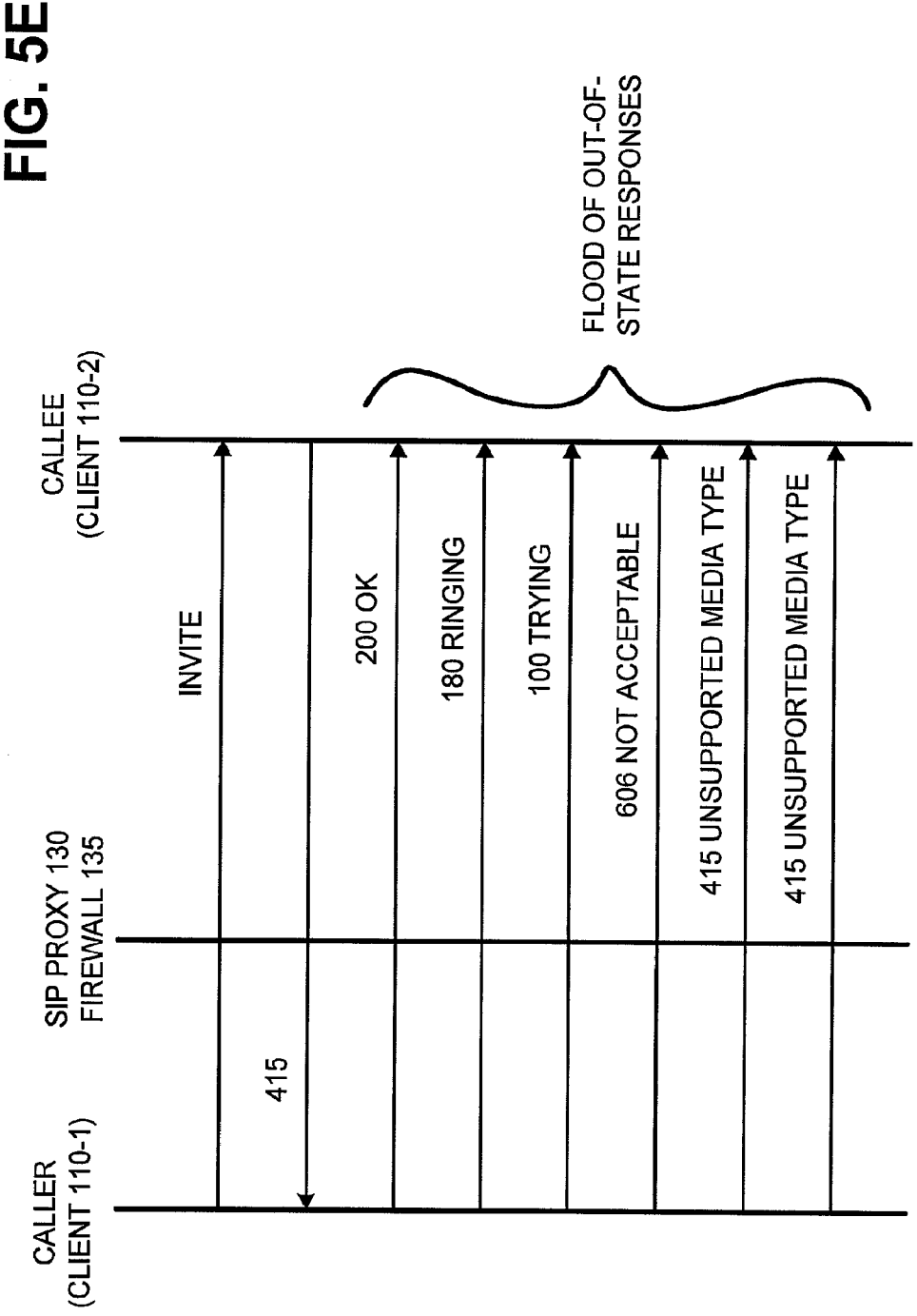

Using spoofed SIP requests (e.g., INVITE messages) is just one way of attacking SIP proxy 130. Because SIP messages may be requests (e.g., "methods" in SIP terminology, such as an INVITE message) or responses to a request, an attacker may use floods of methods, floods of responses, or floods of out-of-state request/responses in an attempt to overwhelm SIP proxy 130 to force it to break down. FIG. 5A, discussed below, shows an exemplary method flood. FIGS. 5B, 5C, and 5D, discussed below, show exemplary floods of responses. FIGS. 5E, 5F, and 5G discussed below, show exemplary out-of-state request/response floods. Rate-limiting filters ("RL filters"), described in co-pending application Ser. No. 11/557,739, are designed to filter such attacks.

FIG. 5A is a diagram of an exemplary method flood. Method floods, which may be created by sending continuous method requests with the same transaction ID, may increase processing requirements of SIP proxy 130 and may eventually get SIP proxy 130 to break down. For example, a flood of INVITE messages with same transaction ID may confuse SIP proxy 130 or may make SIP proxy 130 work unnecessarily for calls that will never be setup, which may result in performance loss. As shown in FIG. 5A, a caller (such as client 110-1) may generate a flood of INVITE messages after receiving a 200 OK message. All the INVITE messages may include the same transaction ID and after the first INVITE message the subsequent INVITE messages may not conform with the SIP standard and may be considered "out of state." Such out-of-state messages may cause excess processing load on SIP proxy 130.

FIGS. 5B, 5C, and 5D are diagrams of exemplary floods of responses. Response floods, which may be created by repeatedly sending a single response with the same transaction ID, may also cause an excessive processing load on SIP proxy 130. FIG. 5B is a diagram of an exemplary flood of provisional responses. As shown in FIG. 5B, a caller (such as client 110-1) may send multiple provisional responses (e.g., 180 RINGING messages) to a callee (such as client 110-2). FIG. 5C is a diagram of an exemplary flood of final responses. As shown in FIG. 5C, a callee (such as client 110-2) may send repeated final responses (e.g., 200 OK messages) to a caller (such as client 110-1). FIG. 5D is a diagram of an exemplary flood of error responses. As shown in FIG. 5D, a caller (such as client 110-1) may send a flood of error messages (e.g., 415 UNSUPPORTED MEDIA TYPE messages) to a callee (such as client 110-2). Although multiple error responses are typical for a particular transaction, a large number of error responses may create an improper flood of error messages.

FIGS. 5E, 5F, and 5G are diagrams of out-of-state sequences of requests or responses. Out-of-state floods, created by sending messages different than expected from SIP protocol description (e.g., out-of-state messages), may also cause excessive processing load on SIP proxy 130. Out-of-state floods may also include messages with the same transaction ID. FIG. 5E is a diagram of an exemplary flood of out-of-state responses. As shown in FIG. 5E, a caller (such as client 110-1) may respond to a callee (such as client 110-2) with a flood of out-of-state responses for a particular transaction ID. FIG. 5F is a diagram of an exemplary flood of out-of-state 4XX error responses. As shown in FIG. 5F, a caller (such as client 110-1) may send a flood of 4XX out-of-state error messages (e.g., "415 UNSUPPORTED MEDIA TYPE") following a "606 NOT ACCEPTABLE" error message. FIG. 5G is a diagram of an exemplary flood of out-of-state random responses. As shown in FIG. 5G, a caller (such as client 110-1) may send a flood of out-of-state random messages (without an associated transaction ID) to a caller (such as client 110-2). While the SIP protocol calls for a single transaction ID to have a single request method, the attach shown in FIG. 5G may send responses with no transaction ID, which may cause SIP proxy 130 to do extra processing and break down.

Figure 6:
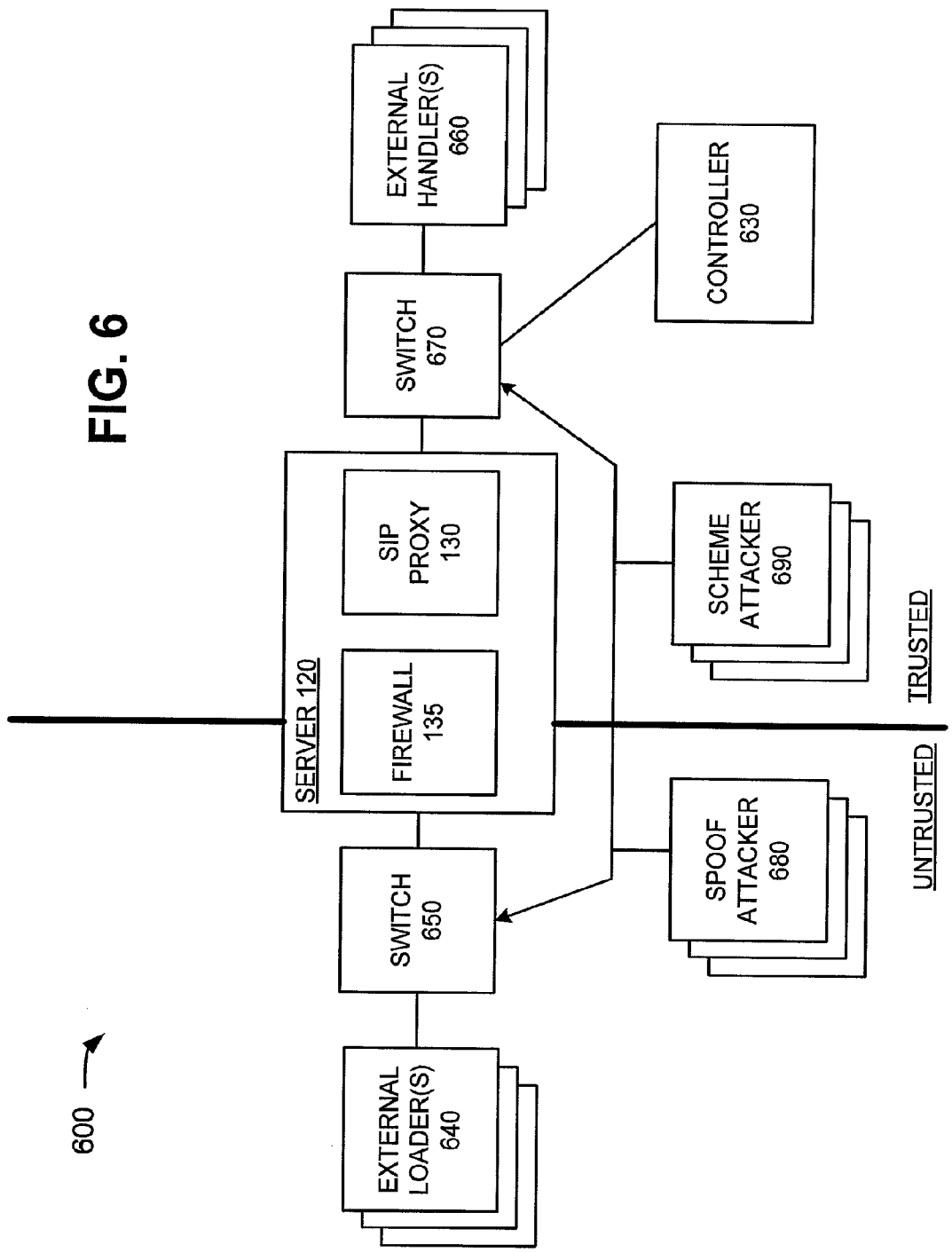
FIG. 6 depicts an exemplary system for testing a firewall and a SIP proxy of an exemplary server illustrated in FIG. 1.

As mentioned above, RR filtering and RL filtering may help thwart DoS attacks. The degree to which authentication and RR filtering and RL filtering help thwart attacks, however, may be tested by test system 600 of FIG. 6. FIG. 6 depicts an exemplary test system 600 for testing firewall 135 and SIP proxy 130 of server 120. Test system 600 may perform testing in a controlled IP telephony test bed that may include several SIP user agents (UAs) generating VoIP calls that traverse firewall 135. SIP proxy 130 may route the signaling traffic between the UAs.

In one embodiment, test system 600 may verify the proper functioning of RR filtering and authentication and their scalability and performance at carrier-scale traffic rates. In another embodiment, test system 600 may verify the proper functioning of RL filtering and its scalability and performance at carrier-scale traffic rates. For example, the rate in which SIP-proxy 130 can handle incoming SIP messages may be bounded by processor power. When authentication is used, this rate decreases as for every incoming SIP request the proxy either computes a new challenge or validates the provided authorization data. An attack flood of spoofed INVITE messages may overload the proxy since it is trying to authenticate each one of the requests. Test system 600 may measure the degree to which RR filter and authentication can thwart spoofed SIP requests.

Test system 600 may include a controller 630, one or more external loaders 640, a switch 650, one or more external handlers 660, a switch 670, a spoof attacker 680, and a scheme attacker 690. Although FIG. 6 shows exemplary components of test system 600, in other implementations test system 600 may contain fewer or additional components that may permit testing, analysis, and validation of a large scale network perimeter protection device (e.g., firewall 135). In still other implementations, one or more components of test system 600 may perform the tasks performed by other components of test system 600.

Controller 630 may be provided in either the untrusted zone or the trusted zone (although FIG. 6 shows controller 630 being provided in the trusted zone). In one implementation, controller 630 may correspond to one of clients 110 shown in FIG. 1, and may include the functionality of one of clients 110. In another implementation, controller 630 may correspond to a device other than a client device, such as a server device. Controller 630 may use Secure Shell (SSH) (e.g., a set of standards and an associated network protocol that may permit establishment of a secure channel between a local and a remote computer) as a control channel, and may coordinate the execution of the testing performed by test system 600.

As shown in FIG. 6, one or more external loaders 640 may be provide in the untrusted zone, and one or more external handlers 660 may be provided in the trusted zone. In one implementation, each external loader 640 may correspond to one or more clients 110 shown in FIG. 1, and may include the functionality of one or more clients 110. Moreover, each external handler 660 may correspond to one or more clients 110 shown in FIG. 1, and may include the functionality of one or more clients 110. In still another implementation, each external loader 640 and/or external handler 660 may correspond to one or more devices other than a client device, such as a server device. External loaders 640 may generate VoIP calls in the untrusted zone that may traverse firewall 135 for load generation purposes. External handlers 660 may handle, in the trusted zone, the VoIP calls generated by external loaders 640.

Spoof attacker 680 may be provided in either the untrusted zone or the trusted zone (although FIG. 6 shows spoof attacker 680 in the untrusted zone). Spoof attacker 680 may generate spoofed SIP requests (e.g., INVITE messages) and may send them to switch 650 or switch 670 for forwarding to server 120. Spoof attacker 680 may implement SIPStone™, a Columbia University developed benchmarking tool for SIP proxy and redirect servers. Using SIPStone, for example, spoof attacker 680 may generate spoofed traffic and may implement null digest authentication and may spoof source IP address and SIP requests. Spoof attacker 680 may use tools other than SIPStone, such as SIPp, an open source tool that may generate attack traffic, such as spoofed SIP requests (e.g., spoofed INVITE messages).

Scheme attacker 690 may be provided in either the untrusted zone or the trusted zone (although FIG. 6 shows scheme attacker 690 in the trusted zone). Scheme attacker 690 may implement SIPp. Scheme attacker 690 may generate method floods (e.g., SIP request floods), response floods, and out-of-state floods. Scheme attacker 690 may also acts as a loader and/or a handler for testing purposes. Scheme attacker 690, using SIPp, may be configured using templates that can emulate a state machine. Attack traffic from scheme attacker 690 may be considered "scheme attack traffic."

To simulate method floods, scheme attacker 690 may use SIPp to create a template that sends multiple INVITE messages (which may include the same transaction ID) instead of a typical sequence. For example, scheme attacker 690 may send a flood of INVITE messages as shown in FIG. 5A. To simulate response floods, scheme attacker 690 may use SIPp to create a template that sends multiple responses (e.g., informational messages, success messages, or error messages, which may include the same transaction ID) instead of a typical response sequence. For example, scheme attacker 690 may send a flood of messages similar to those in FIGS. 5B, 5C, and/or 5D. To simulate out-of-state messages, scheme attacker 690 may use SIPp to generate out-of-state sequences of request and/or response messages (which may include the same transaction ID). For example, scheme attacker 690 may send a flood of messages similar to those in FIGS. 5E, 5F, and/or 5G.

Spoof attacker 680, scheme attacker 690, external loaders 640, and/or external handlers 660 may incorporate traffic generation and analysis tools (e.g., VoIP traffic generation for both SIP signaling and RTP media), scanning probes, a protocol analyzer, a promiscuous mode packet analyzer, etc. These traffic generation components may generate signaling and may correlate media traffic for simulating VoIP calls. Further, one or more of spoof attacker 680, scheme attacker 690, external loaders 640, and/or external handlers 660 may be combined into a single device using, for example, SIPp.

Spoof attacker 680, scheme attacker 690, and external loaders 640 may connect to server 120 via switch 650. Controller 630, spoof attacker 680, scheme attacker 690, and external handlers 660 may connect to server 120 via switch 670. Switches 650 and 670 may include a data transfer device, such as a gateway, a router, a switch, a firewall, a bridge, a proxy server, or some other type of device that processes and/or transfers data.

Test system 600 (e.g., controller 630) may cause external loaders 640 to generate an external load on firewall 135. Test system 600 (e.g., controller 630) may read an input benchmark configuration file that may specify user names of external loaders 640 and external handlers 660; an IP address of SIP proxy 130; IP addresses of external loaders 640, and external handlers 660; a calls per second rate; a total number of calls to generate; etc. Test system 600 (e.g., controller 630) may establish a configurable number of concurrent calls that may be handled by firewall 135. External loaders 640 and external handlers 660 may provide a distributed processing environment to accomplish external loading of firewall 135. Such an environment may enable test system 600 to provide various external load conditions for firewall 135.

The following example illustrates operation of the above test system 600. In this example, test system 600 (e.g., controller 630) may cause a single external loader 640 and a single external handler 660 to generate up to 6,000 or more concurrent calls. Five pairs of external loaders 640 and external handlers 660 may generate up to, for example, 30,000 or more concurrent calls, e.g., 30,000 RTP streams in each direction or 60,000 total RTP streams. Further, each call may include two RTP streams, and that each RTP stream may include a 160 byte RIP packet payload. In one embodiment, test system 600 may test SIP proxy 130 and/or firewall 135 with SIP signaling, but without RTP streams. As the load on SIP proxy 130 and/or firewall 135 increases, signal processing may be delayed, SIP packets may not be timely handled, and/or RTP packets may be sent further and further apart. As a result, at some point (e.g., the breaking point) no more new calls may be established and/or a total generated bandwidth may be limited.

Test system 600 may perform many types of testing on firewall 135 and/or SIP proxy 130. For testing the performance of RR filtering and authentication, these tests may: (1) identify the breaking point (e.g., the point where no new calls may be established and/or a total generated bandwidth is limited) of SIP proxy 130 and/or firewall 135 without any security enhancements (e.g., without authentication or RR filtering) and without simulated attack traffic; (2) identify the breaking point of SIP proxy 130 and/or firewall 135 with authentication (without RR filtering) and without simulated attack traffic; (3) identify the breaking point of SIP proxy 130 and/or firewall 135 with authentication and with simulated spoofed attack traffic; (4) identify the breaking point of server 120 with authentication and RR filtering and with simulated spoofed attack traffic. In tests (1) through (4) above, RL filtering and scheme attacker 690 may be disabled.

For each of tests (1) through (4) above, test system 600 may measure the number of legitimate requests dropped (denoted $L_{egitimate}$). Further, for each of tests (3) and (4) above, test system 600 may measure number of spoofed requests that pass through the RR filter (denoted $S_{poofed}$). The false positive rate (denoted as fp) may be calculated as $L_{egitimate}/D_{efense}*100$. The detection rate (denoted as d) may be calculated as $S_{poofed}/D_{efense}*100$. Ideally, the detection rate (d) is equal to 100% and the false positive rate (fp) is equal to zero. The detection rate (d) and the false positive rate (fp) may be measured for varying call rates, e.g., the number of calls and calls per second.

Test system 600 may test the ability of the RL filters to ward off attacks of method floods, response floods, and/or out-of-state floods generated by scheme attacker 690. For testing the performance of RL filtering, the tests may include: (1) identify the breaking point of SIP proxy 130 and/or firewall 135 without any security enhancements or simulated attack traffic; (2) identify the breaking point of SIP proxy 130 and/or firewall 135 with RL filtering but without simulated attack traffic; (3) identify the breaking point of SIP proxy 130 and/or firewall 135 with RL filtering and with simulated attack traffic from scheme attacker 690; (4) identify the breaking point of SIP proxy 130 and/or firewall 135 with RL filtering and with simulated attack traffic from scheme attacker 690. In tests (1) through (4) above, authentication, RR filtering, and spoof attacker 680 may be disabled.

Figure 7:
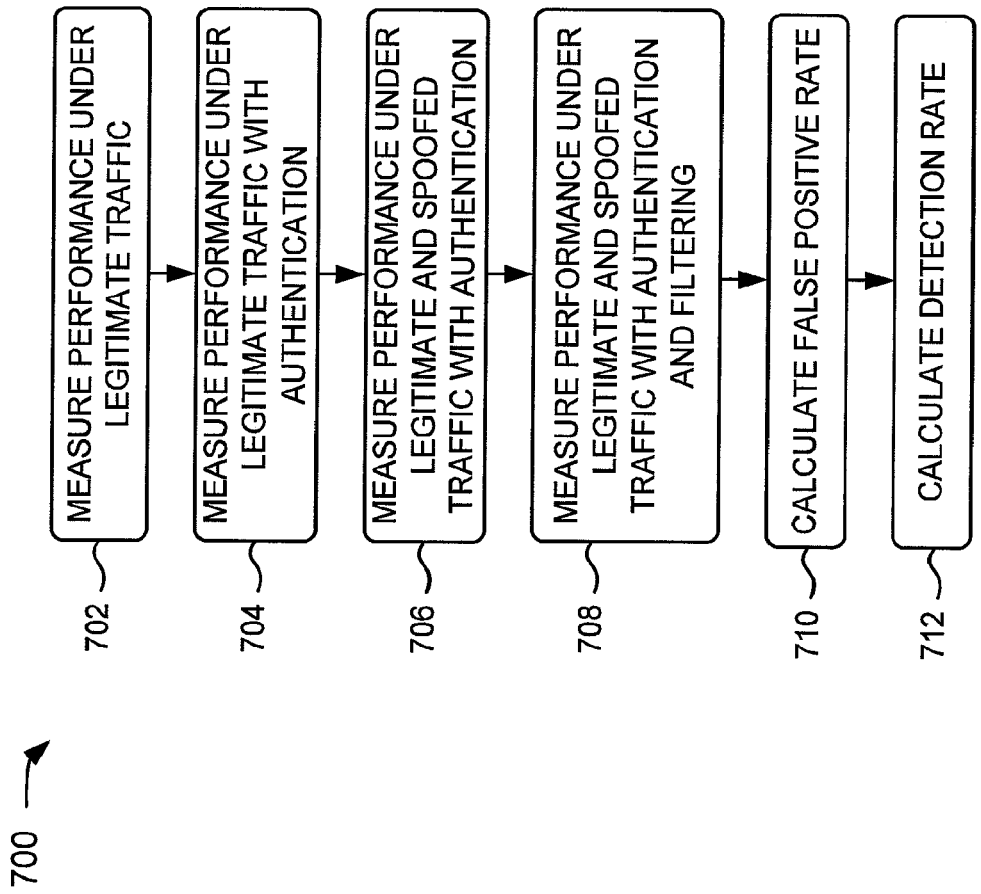

FIG. 7 is a flowchart of an exemplary process 700 for testing the performance of RR filtering and authentication. Process 700 may begin with controller 630 initiating a measurement test of SIP proxy 130 and/or firewall 135. The performance of server 120 may be measured under the load of legitimate requests (block 702). In this example, test system 600 may identify the breaking point of SIP proxy 130 without any security enhancements (e.g., authentication or RR filtering) or simulated attack traffic. The breaking point under these conditions (no security enhancements or simulated attacks) may be considered $C_{apacity}$.

The performance of server 120 may be measured under the load of legitimate requests with authentication enabled (block 704). In this example, test system 600 may also identify the breaking point of SIP proxy and/or firewall 135 with authentication enabled (e.g., a security enhancement) but without RR filtering and without any simulated attack traffic. In this case, test system 600 may implement the authentication as described above with respect to FIG. 4, for example. The breaking point under these conditions (authentication enabled, but no simulated attacks) may be considered $N_{ormal}$. Given the security enhancements, it may be expected that $N_{ormal}$ may be less than $C_{apacity}$.

The performance of server 120 may be measured under the load of legitimate requests and spoofed requests, e.g., attack traffic, with authentication enabled (block 706). In this example, test system 600 may also identify the breaking point of SIP proxy 130 and/or firewall 135 with authentication (without RR filtering) and with a simulated attack traffic. In this case, testing system may implement the authentication as described above with respect to FIG. 4, for example. In addition, spoof attacker 680 may send a flood of spoofed INVITE messages to switch 650, which may be forwarded to server 120. The breaking point under these conditions (authentication enabled with simulated attacks) may be considered $A_{ttack}$. Given the security enhancements and attack, it may be expected that $A_{ttack}$ is less than $N_{ormal}$.

The performance of server 120 may be measured under the load of legitimate requests and spoofed requests, e.g., attack traffic, with authentication and RR filtering enabled (block 708). In this example, test system 600 may also identify the breaking point of SIP proxy 130 and/or firewall 135 with authentication, RR filtering, and with a simulated attack traffic. In this case, testing system may implement the authentication and RR filtering as described above with respect to FIG. 4, for example. In addition, spoof attacker 680 may send a flood of spoofed INVITE messages to switch 650, which may be forwarded to server 120. The breaking point under these conditions (authentication and RR filtering enabled with legitimate traffic and simulated attacks) may be considered $D_{efense}$. Ideally, authentication and RR filtering may allow $D_{efense}$ to be equal to $N_{ormal}$. In non-ideal situations, the authentication and RR filtering may allow $D_{efense}$ to be less than $A_{ttack}$ but greater than $N_{ormal}$. Test system 600 may also measure the legitimate traffic blocked by RR filter (denoted above as $L_{egitimate}$) and attack traffic not blocked by RR filter (denoted above as $S_{poofed}$).

False positive rate(s) may be calculated (block 710). As indicated above, the false positive rate (denoted fp) may be calculated as $L_{egitimate}/D_{efense}*100$. Ideally, the false positive rate (fp) is equal to zero. Detection rate(s) may also be calculated (block 712). As indicated above, the detection rate (denoted d) may be calculated as $S_{poofed}/D_{efense}*100$. Ideally, the detection rate (d) is equal to 100%.

Figure 8:
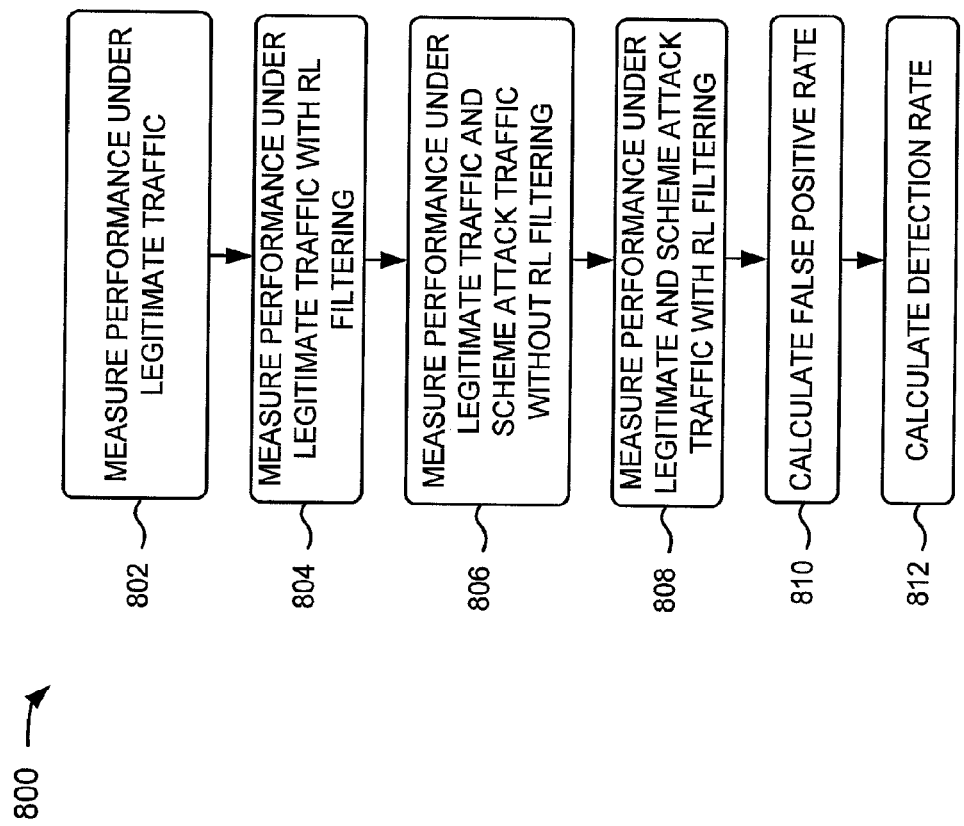

FIG. 8 is a flowchart of an exemplary process 800 for testing RL filtering. Process 800 may begin with controller 630 initiating a performance measurement of SIP proxy 130 and/or firewall 135. The performance of server 120 may be measured under the load of legitimate traffic (block 802). In this example, test system 600 may identify the breaking point of SIP proxy 130 and/or firewall 135 without any security enhancements or simulated attack traffic. As in process 700, the breaking point under these conditions (no security enhancements or simulated attacks) may be considered $C_{apacity}$.

The performance of server 120 may be measured under legitimate traffic with RL filtering enabled (block 804). In this example, test system 600 may identify the breaking point of SIP proxy 130 and/or firewall 135 with RL filtering (e.g., a security enhancement), but without simulated attack traffic. The breaking point under these conditions (RL filtering with no attack traffic) may be considered $B_{aseline}$. Under ideal conditions, $B_{aseline}$ should be equal to $C_{apacity}$.

The performance of server 120 may be measured under legitimate traffic and scheme attack traffic without RL filtering enabled (block 806). The attack traffic may include method floods, response floods, and/or out-of-state floods. An example of a method flood is found in FIG. 5A. Examples of response floods are found in FIGS. 5B, 5C, and 5D. Examples of out-of-state floods are found in FIGS. 5E, 5F, and 5G. The breaking point under these conditions (without RL filter enabled but with legitimate and attack traffic) may be considered $S_{attack}$. $S_{attack}$ may be less than $C_{apacity}$.

The performance of server 120 may be measured under legitimate traffic and scheme attack traffic with RL filtering enabled (block 808). As with block 806, the attack traffic may include method floods, response floods, and/or out-of-state floods. An example of a method flood is found in FIG. 5A. Examples of response floods are found in FIGS. 5B, 5C, and 5D. Examples of out-of-state floods are found in FIGS. 5E, 5F, and 5G. The breaking point under these conditions (with RL filtering enabled and with legitimate and attack traffic) may be considered $D_{scheme}$. Ideally, $D_{scheme}$ may be equal to $B_{aseline}$. In non-ideal situations, $D_{scheme}$ may be less than $B_{aseline}$, but greater than $S_{attack}$. Test system 600 may also measure the legitimate traffic blocked by RL filter (denoted $L_{egitimate}$) and attack traffic not blocked by RL filter (denoted as $S_{cheme}$).

False positive rate(s) may be calculated (block 810). the false positive rate (denoted fp) may be calculated as $L_{egitimate}/D_{scheme}*100$. Ideally, the false positive rate (fp) is equal to zero. Detection rate(s) may also be calculated (block 812). The detection rate (denoted d) may be calculated as $S_{cheme}/D_{scheme}*100$. Ideally, the detection rate (d) is equal to 100%.

Figure 9:
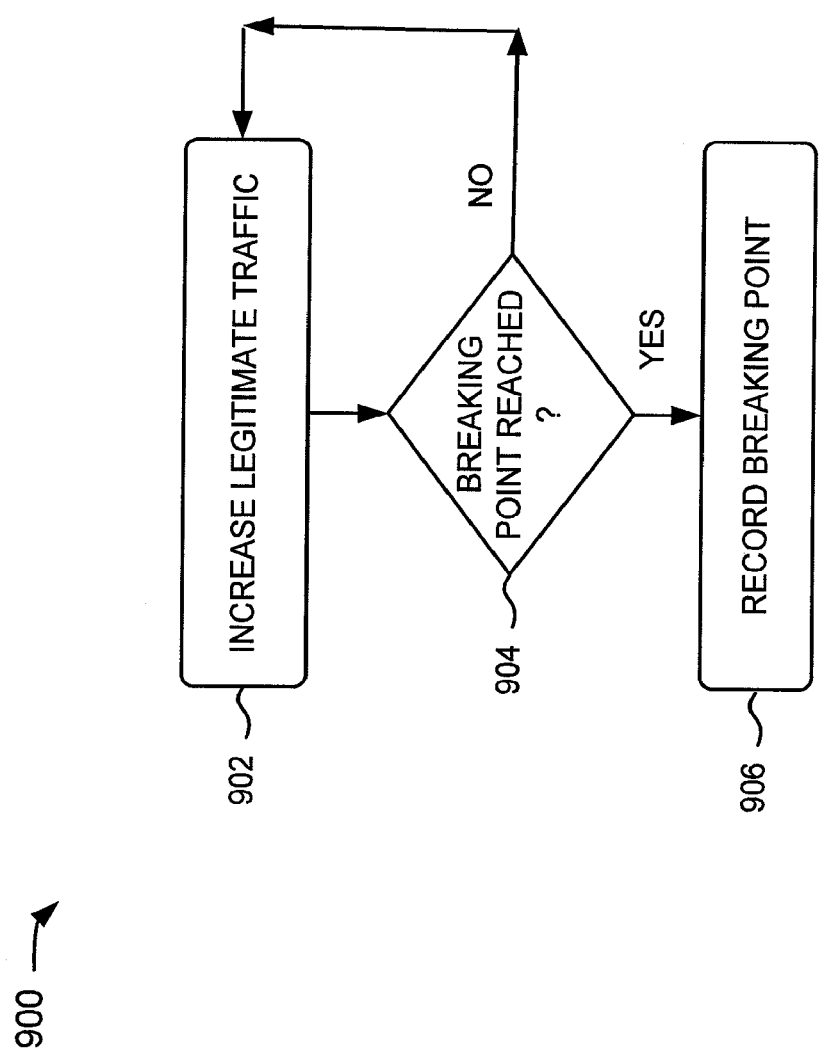

FIG. 9 is a flowchart of an exemplary process 900 for measuring a breaking point of SIP proxy 130/firewall 135 without attack traffic. Process 900 may begin with controller 630 starting a simulation. Legitimate traffic may be increased (block 902). Legitimate traffic may be measured in the number of calls (e.g., INVITE messages) generated per second, for example. If the breaking point is not reached (block 904: NO), process 900 may begin again and legitimate traffic may be increased more (block 902). The breaking point may be determined, for example, if SIP proxy 130 cannot accept another call and/or if firewall 135 cannot filter and forward packets fast enough. The particular speed may be predetermined and may be based on rates associated with real traffic conditions. If the breaking point has been reached (block 904: YES), then the breaking point is recorded (block 906). In other words, process 900 increases legitimate traffic until SIP proxy 130 and/or firewall breaks in order to measure the breaking point. Process 900 may be applied to blocks 702 through 708 of process 700 in FIG. 7. Process 900 may also be applied to blocks 802 through 808 of process 800 of FIG. 8.

FIG. 10 is a flowchart of an exemplary process 1000 for measuring the breaking point of SIP proxy 130 and/or firewall 135 with attack traffic. Process 1000 may begin with controller 630 starting a simulation. Attack traffic may be increased (block 1002). Attack traffic may be measured by the number of calls generated (or requested) per second or by the number of SIP messages generated per second, for example. Legitimate traffic may be increased (block 1004). As with process 900, legitimate traffic may be measured in the number of calls (e.g., INVITE messages) generated per second, for example. If the breaking point is not reached (block 1004: NO), process 1000 may return to block 1004 and legitimate traffic may be increased again (block 1004). As with process 900, the breaking point may be determined, for example, if SIP proxy 130 cannot accept another call or if firewall 135 cannot filter and forward packets fast enough to meet, for example, predetermined rates. If the breaking point has been reached, the breaking point may be recorded (block 1008) and legitimate traffic may be decreased (block 1010) to a point where SIP proxy 130 and/or firewall 135 is not broken. Process 1000 may then begin again by increasing the attack traffic (block 1002). In other words, process 1000 starts with a given amount of attack traffic and then increases legitimate traffic until SIP proxy 130 and/or firewall 135 breaks. Process 1000 may then lower the legitimate traffic, for example, to a point where SIP proxy 130 and/or firewall 135 is not broken. Process 1000 may then increase the attack traffic, and again increase the legitimate traffic until SIP proxy 130 and/or firewall 135 reaches a breaking point.

FIG. 10 shows two loops, one inside the other. Referring to FIG. 10, the loop formed by blocks 1004 and 1006 inside the loop formed by blocks 1002, 1008, and 1010. In one embodiment, these loops may be inverted. In one embodiment, a scheme attack may include a dialog-based attack described in co-pending application Ser. No. 11/557,739.

Embodiments described herein may test, analyze, and validate a large scale SIP-aware application layer network perimeter protection device (e.g., a firewall). For example, the systems and methods may measure the capacity (e.g., the breaking point) of the SIP-aware firewall as it filters attack traffic, such as spoofed and/or floods of SIP messages. The systems and methods may generate VoIP load traffic for the SIP-aware firewall to test and analyze performance of the SIP-aware firewall under load conditions. The load conditions may include generated attack traffic. The systems and methods described herein may address potential security vulnerabilities of the SIP-aware firewall.

The foregoing description provides illustration and description, but is not intended to be exhaustive or to limit the embodiments to the precise form disclosed. Modifications and variations are possible in light of the above teachings or may be acquired from practice of the invention. For example, while series of acts have been described with regard to the flowcharts of FIGS. 7-10, the order of the acts may differ in other implementations. Further, non-dependent acts may be performed in parallel.

Embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
    transmitting Session Initiation Protocol (SIP) request messages to a SIP proxy device,
        wherein transmitting the SIP request messages includes transmitting, during a first time period, non-attack SIP request messages and simulated attack SIP request messages,
        wherein the non-attack SIP request messages are for establishing communication sessions through a network perimeter protection device and wherein the simulated attack SIP request messages include simulated spoofed source network addresses;
    authenticating, during a first portion of the first time period and during a second portion of the first time period different than the first portion, the SIP request messages, wherein authenticating the SIP request messages includes determining which of the SIP request messages do not include spoofed source network addresses;
    blocking, during the first portion of the first time period but not during the second portion of the first time period, unauthenticated SIP request messages having a source address from which a SIP request message was already received;
    measuring, by a processor, a first performance associated with the SIP proxy device during the first portion of the first time period while authenticating and blocking; and
    measuring, by the processor, a second performance associated with the SIP proxy device during the second portion of the first time period while authenticating and not blocking.

2. The computer-implemented method of claim 1, wherein measuring the first performance or measuring the second performance includes increasing a rate of transmitting the SIP request messages until the SIP proxy cannot establish additional sessions as a result of the SIP proxy being overloaded.

3. The computer-implemented method of claim 1, wherein measuring the first performance or measuring the second performance includes increasing a rate of transmitting the SIP request messages until the SIP proxy cannot establish additional sessions because the SIP proxy is overloaded as a result of the SIP proxy determining which of the SIP request messages do not include spoofed source addresses or as a result of the SIP proxy not being able to process the SIP request messages.

4. The computer-implemented method of claim 1, wherein measuring the first performance or measuring the second performance includes increasing a rate of transmitting the SIP request messages until the network perimeter protection device cannot filter and forward packets at a predetermined rate.

5. The computer-implemented method of claim 1,
    wherein transmitting the SIP request messages includes transmitting, during a second time period different than the first time period, the non-attack SIP request messages while not transmitting the simulated attack SIP request messages, wherein the method further comprises:
    authenticating, during the second time period, the SIP request messages, wherein authenticating the SIP request messages includes determining which of the SIP request messages do not include spoofed source network addresses; and
    measuring, by the processor, a third performance associated with the SIP proxy device during the second time period while authenticating.

6. The computer-implemented method of claim 5, wherein transmitting the SIP request messages includes transmitting, during a third time period different than the first time period and the second time period, the non-attack SIP request messages while not transmitting the simulated attack SIP request messages, wherein the method further comprises:
    authenticating, during the third time period, the SIP request messages while not blocking unauthenticated SIP request messages having a source address from which a SIP request message was already received, wherein authenticating the SIP request messages includes determining which of the SIP request messages do not include spoofed source network addresses; and
    measuring, by the processor, a fourth performance associated with the network perimeter protection device during the third time period.

7. The computer-implemented method of claim 1, further comprising:
    determining a number of blocked non-attack SIP request messages; and
    determining a value indicative of a false positive rate based on the number of blocked non-attack SIP request messages and the first performance.

8. The computer-implemented method of claim 1, further comprising:
    determining a number of simulated attack SIP request messages not blocked; and
    determining a value indicative of a detection rate based on the number of simulated attack SIP request messages not blocked and the first performance.

9. A computer-implemented method comprising:
    transmitting Session Initiation Protocol (SIP) messages to a SIP proxy device,
        wherein transmitting the SIP messages includes transmitting, during a first time period, non-attack SIP request messages and simulated attack SIP messages, and transmitting, during a second time period different than the first time period, the non-attack SIP request messages without the simulated attack SIP messages,
        wherein the non-attack SIP request messages are for establishing communication sessions through a network perimeter protection device and wherein the simulated attack SIP messages include a flood of out-of-state SIP messages;

rate-limit filtering, during both the first time period and the second time period, the SIP messages, wherein rate-limit filtering includes limiting a number of SIP request or response messages to a particular rate;

measuring, by a processor, a first performance associated with the SIP proxy device during the first time period while rate-limit filtering; and measuring, by the processor, a second performance associated with the SIP proxy device during the second time period while rate-limit filtering.

10. The computer-implemented method of claim 9, wherein transmitting SIP messages includes transmitting, during a third time period different than the first time period and the second time period, the non-attack SIP request messages without the simulated attack SIP messages, the method further comprising:

measuring, by the processor, a third performance associated with the SIP proxy device during the third time period while not performing rate-limit filtering.

11. The computer-implemented method of claim 10, wherein transmitting SIP messages includes transmitting, during a fourth time period different than the first time period, the second time period, and the third time period, both the non-attack SIP request messages and the simulated attack SIP messages, the method further comprising:

measuring, by the processor, a fourth performance associated with the SIP proxy device during the fourth time period while not performing rate-limit filtering.

12. The computer-implemented method of claim 9, further comprising:

determining a number of non-attack SIP request messages blocked by rate-limit filtering; and determining a value indicative of a false positive rate based on the number of non-attack SIP request messages blocked and the first performance.

13. The computer-implemented method of claim 9, further comprising:

determining a number of simulated attack SIP messages not blocked by rate-limit filtering; and determining a value indicative of a detection rate based on the number of simulated attack SIP messages not blocked and the first performance.

14. The computer-implemented method of claim 9, wherein measuring the first performance or measuring the second performance includes increasing a rate of transmitting the SIP messages until the SIP proxy cannot establish additional sessions as a result of the SIP proxy being overloaded.

15. The computer-implemented method of claim 9, wherein measuring the first performance or measuring the second performance includes increasing a rate of transmitting the SIP messages until the SIP proxy cannot establish additional sessions as a result of a processor in the SIP proxy not being able to process the SIP messages.

16. The computer-implemented method of claim 9, wherein measuring the first performance or measuring the second performance includes increasing a rate of transmitting the SIP messages until the network perimeter protection device cannot filter and forward packets at a predetermined rate.

17. A system comprising:

a transmitter to transmit Session Initiation Protocol (SIP) request messages to a SIP proxy device, wherein the transmitter transmits, during a first time period, non-attack SIP request messages and simulated attack SIP request messages, wherein the non-attack SIP request messages are for establishing communication sessions through a network perimeter protection device and wherein the simulated attack SIP request messages include simulated spoofed source network addresses; and a processor to authenticate, during a first portion of the first time period and during a second portion of the first time period different than the first portion, the SIP request messages, wherein the processor determines which of the SIP request messages do not include spoofed source network addresses;

wherein the processor is configured to determine to block, during the first portion of the first time period but not during the second portion of the first time period, unauthenticated SIP request messages having a source address from which a SIP request message was already received;

wherein the processor is configured to measure a first performance associated with the SIP proxy device during the first portion of the first time period while authenticating and blocking, and to measure a second performance associated with the SIP proxy device during the second portion of the first time period while authenticating and not blocking.

18. The system of claim 17, wherein the transmitter is configured to increase a rate of transmitting the SIP request messages, and wherein the processor is configured to measure the first performance or the second performance based on the SIP proxy not being able to establish additional sessions as a result of the SIP proxy being overloaded.

19. The system of claim 17, wherein the transmitter is configured to increase a rate of transmitting the SIP request messages, and wherein the processor is configured to measure the first performance or the second performance based on the SIP proxy not being able to establish additional sessions because the processor is overloaded as a result of the processor determining which of the SIP request messages do not include spoofed source addresses or as a result of the processor not being able to process the SIP request messages.

20. The system of claim 17, wherein the transmitter is configured to transmit, during a second time period different than the first time period, the non-attack SIP request messages while not transmitting the simulated attack SIP request messages, wherein the processor is configured to authenticate, during the second time period, the SIP request messages, wherein the processor determines which of the SIP request messages do not include spoofed source network addresses; and wherein the processor is configured to measure a third performance associated with the SIP proxy device during the second time period.

21. The system of claim 20, wherein the transmitter is configured to transmit, during a third time period different than the first time period and the second time period, the non-attack SIP request messages while not transmitting the simulated attack SIP request messages, wherein the processor is configured authenticates, during the third time period, the SIP request messages while not blocking unauthenticated SIP request messages having a source address from which a SIP request message was already received, wherein the processor authenticates by determining which of the SIP request messages do not include spoofed source network addresses; and wherein the processor measures a fourth performance associated with the network perimeter protection device during the third time period.

* * * * *